(12) United States Patent
Matsukawa

(10) Patent No.: US 11,767,811 B2
(45) Date of Patent: Sep. 26, 2023

(54) SUPPLEMENTAL FUEL SYSTEM FOR COMPRESSION-IGNITION ENGINE

(71) Applicant: American CNG, LLC, Layton, UT (US)

(72) Inventor: Matt Matsukawa, Layton, UT (US)

(73) Assignee: American CNG, LLC, Layton, UT (US)

(*) Notice: Subject to any disclaimer, the term of this patent is extended or adjusted under 35 U.S.C. 154(b) by 0 days.

(21) Appl. No.: 17/900,226

(22) Filed: Aug. 31, 2022

(65) Prior Publication Data
US 2023/0070025 A1    Mar. 9, 2023

Related U.S. Application Data

(60) Provisional application No. 63/324,447, filed on Mar. 28, 2022, provisional application No. 63/324,230, (Continued)

(51) Int. Cl.
*F02M 21/04* (2006.01)
*F02M 21/02* (2006.01)
(Continued)

(52) U.S. Cl.
CPC ....... *F02M 21/047* (2013.01); *F02D 19/0605* (2013.01); *F02D 19/0607* (2013.01); *F02D 19/0665* (2013.01); *F02D 19/0673* (2013.01); *F02D 19/0681* (2013.01); *F02D 41/0027* (2013.01); *F02D 41/3035* (2013.01); *F02D 41/36* (2013.01); *F02M 21/026* (2013.01); *F02M 21/0221* (2013.01);
(Continued)

(58) Field of Classification Search
None
See application file for complete search history.

(56) References Cited

U.S. PATENT DOCUMENTS 2,143,194 A    1/1939  Holzapfel
2,209,206 A    7/1940  Peduzzi
(Continued)

FOREIGN PATENT DOCUMENTS

CN    203308606 U    11/2013
CN    105370446 A     3/2016
(Continued)

OTHER PUBLICATIONS

PCT International Search Report and Written Opinion for International Application No. PCT/US22/42131 dated Jan. 27, 2023, 25 pages.

*Primary Examiner* — Kevin R Steckbauer
(74) *Attorney, Agent, or Firm* — Foley & Lardner LLP

(57) ABSTRACT

A supplemental fuel system for a machine having a compression-ignition engine includes an air intake tube. The air intake tube has a first end configured to interface with an air cleaner of an air supply system that provides air to the compression-ignition engine, a second end configured to interface with a compressor of a turbocharger of the air supply system, and a sidewall extending between the first end and the second end. The sidewall includes a fuel interface configured to facilitate providing a supplemental fuel into the air intake tube to mix with the air upstream of the compressor of the turbocharger.

15 Claims, 12 Drawing Sheets

Related U.S. Application Data filed on Mar. 28, 2022, provisional application No. 63/324,420, filed on Mar. 28, 2022, provisional application No. 63/324,306, filed on Mar. 28, 2022, provisional application No. 63/324,411, filed on Mar. 28, 2022, provisional application No. 63/324,224, filed on Mar. 28, 2022, provisional application No. 63/324,231, filed on Mar. 28, 2022, provisional application No. 62/497,357, filed on Sep. 1, 2021.

(51) Int. Cl.
  *F02D 41/00* (2006.01)
  *F02D 41/30* (2006.01)
  *F02D 41/36* (2006.01)
  *F02D 19/06* (2006.01)
  *F02M 35/10* (2006.01)

(52) U.S. Cl.
  CPC .... *F02M 21/0239* (2013.01); *F02M 21/0242* (2013.01); *F02M 21/0278* (2013.01); *F02M 21/0296* (2013.01); *F02M 35/10157* (2013.01); *F02M 35/10216* (2013.01); *F02D 2200/021* (2013.01); *F02D 2200/503* (2013.01); *F02D 2200/60* (2013.01); *F02M 21/0215* (2013.01)

(56) References Cited

U.S. PATENT DOCUMENTS

| | | |
|---|---|---|
| 2,563,228 A | 8/1951 | Ensign |
| 2,781,752 A * | 2/1957 | Bussche Van Den ....... F02M 21/042 48/184 |
| 2,799,564 A | 7/1957 | Ensign |
| 2,821,373 A | 1/1958 | Olson |
| 2,868,630 A | 7/1959 | Ensign |
| 2,894,829 A | 7/1959 | Harrison et al. |
| 2,899,184 A | 8/1959 | Olson |
| 3,395,899 A | 8/1968 | Kopa |
| 3,484,220 A | 12/1969 | Jones |
| 3,648,988 A | 3/1972 | Dibert |
| 3,664,818 A * | 5/1972 | Kramer ............. F02M 21/0212 48/189.4 |
| 3,837,628 A | 9/1974 | Bartholomew |
| 3,843,338 A | 10/1974 | Zonker |
| 4,073,832 A | 2/1978 | Mcgann |
| 4,174,690 A | 11/1979 | Sumiyoshi |
| 4,335,697 A | 6/1982 | Mclean |
| 4,347,822 A | 9/1982 | Casey |
| 4,352,677 A | 10/1982 | Jones |
| 4,375,795 A | 3/1983 | Billingsley |
| 4,387,685 A | 6/1983 | Abbey |
| 4,437,448 A | 3/1984 | Billingsley |
| 4,463,734 A | 8/1984 | Akeroyd |
| 4,476,827 A | 10/1984 | Basaglia et al. |
| 4,499,885 A | 2/1985 | Weissenbach et al. |
| 4,499,887 A | 2/1985 | Billingsley et al. |
| 4,517,928 A * | 5/1985 | Wolters ............. F02D 19/0678 123/526 |
| 4,519,367 A * | 5/1985 | Nomura .................. F02M 23/04 123/683 |
| 4,559,185 A * | 12/1985 | Seto .......... F02M 7/28 261/41.5 |
| 4,564,298 A | 1/1986 | Gritters et al. |
| 4,619,240 A | 10/1986 | Bedford et al. |
| 4,694,802 A | 9/1987 | Lowi, Jr. |
| 4,704,997 A | 11/1987 | Endo et al. |
| 4,802,507 A | 2/1989 | Willson |
| 4,838,295 A | 6/1989 | Miller |
| 4,909,209 A | 3/1990 | Takahasi |
| 4,953,516 A | 9/1990 | Van Der Weide et al. |
| 4,991,561 A | 2/1991 | Gerassimov et al. |
| 5,070,851 A * | 12/1991 | Janisch .................. F02M 13/08 123/527 |
| 5,136,986 A | 8/1992 | Jensen |
| 5,176,448 A | 1/1993 | King et al. |
| 5,224,457 A | 7/1993 | Arsenault et al. |
| 5,345,918 A | 9/1994 | Lambert |
| 5,355,854 A | 10/1994 | Aubee |
| 5,370,097 A | 12/1994 | Davis |
| 5,386,145 A | 1/1995 | Boswell |
| 5,408,978 A | 4/1995 | Davis |
| 5,595,163 A | 1/1997 | Nogi et al. |
| 5,755,254 A | 5/1998 | Carter et al. |
| 5,809,970 A | 9/1998 | Smith et al. |
| 5,868,121 A | 2/1999 | Brown et al. |
| 6,003,478 A | 12/1999 | Huber |
| 6,050,246 A * | 4/2000 | Abdelmesih ....... F02M 21/0233 123/527 |
| 6,145,494 A | 11/2000 | Klopp |
| 6,250,260 B1 | 6/2001 | Green |
| 6,694,242 B2 | 2/2004 | Wong |
| 6,863,034 B2 | 3/2005 | Kern et al. |
| 6,880,535 B2 * | 4/2005 | Sorter .................... F02M 26/19 60/614 |
| 6,901,889 B1 | 6/2005 | Ritter et al. |
| 6,955,160 B1 | 10/2005 | Konopacki et al. |
| 7,000,573 B2 | 2/2006 | Kruger |
| 7,019,626 B1 | 3/2006 | Funk |
| 7,066,155 B2 | 6/2006 | Uhde et al. |
| 7,222,015 B2 | 5/2007 | Davis et al. |
| 7,225,763 B2 | 6/2007 | Ritter et al. |
| 7,387,091 B2 | 6/2008 | Ritter |
| 7,509,209 B2 | 3/2009 | Davis et al. |
| 7,533,634 B2 | 5/2009 | Ritter et al. |
| 7,823,562 B2 | 11/2010 | Duineveld et al. |
| 8,267,064 B2 | 9/2012 | Martin et al. |
| 8,412,439 B2 | 4/2013 | Warner et al. |
| 9,031,763 B2 | 5/2015 | Green |
| 9,057,331 B2 | 6/2015 | Hoshi et al. |
| 9,328,673 B2 | 5/2016 | Inoue et al. |
| 9,394,841 B1 | 7/2016 | Green |
| 9,410,490 B2 | 8/2016 | Kolhouse et al. |
| 9,752,515 B1 | 9/2017 | Stroup |
| 9,845,744 B2 | 12/2017 | Green |
| 9,857,802 B2 | 1/2018 | Yates et al. |
| 9,885,318 B2 | 2/2018 | Green |
| 9,988,990 B2 | 6/2018 | Bhatt et al. |
| 10,100,723 B2 | 10/2018 | Kolhouse et al. |
| 10,100,781 B1 | 10/2018 | Catchings et al. |
| 10,161,318 B2 | 12/2018 | Stroup |
| 10,287,943 B1 | 5/2019 | Schiltz |
| 10,330,032 B2 | 6/2019 | Benner et al. |
| 10,371,069 B2 | 8/2019 | Bzymek et al. |
| 10,578,034 B2 | 3/2020 | Macdonald |
| 10,815,913 B2 | 10/2020 | Bruner et al. |
| 10,890,106 B2 | 1/2021 | Bach |
| 11,073,122 B2 | 7/2021 | Burns et al. |
| 11,105,278 B2 | 8/2021 | Atterberry et al. |
| 11,131,273 B2 | 9/2021 | Abei et al. |
| 11,181,051 B2 * | 11/2021 | Klüting ................. F02M 26/51 |
| 11,236,665 B2 | 2/2022 | Bach |
| 11,255,279 B2 | 2/2022 | Schiltz et al. |
| 2001/0032628 A1 | 10/2001 | Goto et al. |
| 2002/0007805 A1 | 1/2002 | Green |
| 2002/0014227 A1 | 2/2002 | Girouard |
| 2002/0029770 A1 | 3/2002 | Heffel et al. |
| 2002/0083980 A1 | 7/2002 | Nakajima et al. |
| 2002/0185086 A1 | 12/2002 | Newman et al. |
| 2004/0020537 A1 | 2/2004 | Girouard |
| 2004/0089279 A1 | 5/2004 | Mclaughlin et al. |
| 2004/0111210 A1 | 6/2004 | Davis et al. |
| 2004/0173192 A1 * | 9/2004 | Sorter .................... F02M 26/19 123/568.18 |
| 2005/0104234 A1 | 5/2005 | Goto |
| 2006/0054144 A1 | 3/2006 | Tokunaga |
| 2006/0168958 A1 | 8/2006 | Vetrovec |
| 2006/0225715 A1 | 10/2006 | Ohashi et al. |
| 2006/0245296 A1 | 11/2006 | Nishioka et al. |
| 2007/0125321 A1 | 6/2007 | Ritter |
| 2007/0152355 A1 | 7/2007 | Hartley |
| 2007/0157909 A1 | 7/2007 | Tokunaga |
| 2007/0157912 A1 | 7/2007 | Ritter et al. |

(56) References Cited

U.S. PATENT DOCUMENTS

| | | |
|---|---|---|
| 2007/0295316 A1 | 12/2007 | Davis et al. |
| 2008/0022983 A1 | 1/2008 | Martindale |
| 2008/0290531 A1 | 11/2008 | Nickels et al. |
| 2009/0071438 A1 | 3/2009 | Shiraishi et al. |
| 2009/0071439 A1 | 3/2009 | Shiraishi et al. |
| 2009/0076709 A1 | 3/2009 | Shiraishi et al. |
| 2009/0088950 A1 | 4/2009 | Fisher et al. |
| 2009/0126691 A1 | 5/2009 | Bach |
| 2009/0287392 A1 | 11/2009 | Thomas |
| 2009/0301443 A1 | 12/2009 | Kojima et al. |
| 2010/0089364 A1 | 4/2010 | Flanagan et al. |
| 2010/0263382 A1 | 10/2010 | Mancini et al. |
| 2010/0269796 A1 | 10/2010 | Namatame |
| 2011/0114193 A1 | 5/2011 | Chen |
| 2011/0114194 A1 | 5/2011 | Chen |
| 2011/0180042 A1 | 7/2011 | Johnson et al. |
| 2012/0004824 A1 | 1/2012 | Milton et al. |
| 2012/0197514 A1 | 8/2012 | Ono et al. |
| 2012/0199102 A1 | 8/2012 | Hoefer et al. |
| 2012/0204975 A1 | 8/2012 | Chen |
| 2012/0266846 A1 | 10/2012 | Kilbourne |
| 2012/0310509 A1 | 12/2012 | Pardo et al. |
| 2013/0047959 A1 | 2/2013 | Holm |
| 2013/0112171 A1 | 5/2013 | Matsukawa |
| 2013/0247876 A1 | 9/2013 | Ninomiya et al. |
| 2013/0333671 A1 | 12/2013 | Walser et al. |
| 2014/0360473 A1 | 12/2014 | Sturman |
| 2014/0373822 A1 | 12/2014 | Rosswurm et al. |
| 2015/0020770 A1 | 1/2015 | Green |
| 2015/0020771 A1 | 1/2015 | Green |
| 2015/0025774 A1 | 1/2015 | Green |
| 2015/0068500 A1 | 3/2015 | Inoue et al. |
| 2015/0233330 A1 | 8/2015 | Matsukawa |
| 2015/0240735 A1 | 8/2015 | Nakazono et al. |
| 2015/0240738 A1 | 8/2015 | Yerace et al. |
| 2015/0346733 A1 | 12/2015 | Yates et al. |
| 2016/0040628 A1 | 2/2016 | Braun |
| 2016/0061685 A1 | 3/2016 | Ishida et al. |
| 2016/0195050 A1 | 7/2016 | Green |
| 2016/0222902 A1 | 8/2016 | Otsubo et al. |
| 2016/0273436 A1 | 9/2016 | Imai et al. |
| 2016/0222920 A1 | 12/2016 | Masako et al. |
| 2017/0009670 A1 | 1/2017 | Sorge et al. |
| 2017/0009681 A1 | 1/2017 | Green |
| 2018/0223774 A1 | 8/2018 | Walser et al. |
| 2018/0347509 A1 | 12/2018 | Wouters |
| 2019/0055904 A1 | 2/2019 | Kejha |
| 2019/0154202 A1 | 5/2019 | Cho et al. |
| 2019/0293027 A1 | 9/2019 | Walser et al. |
| 2019/0331023 A1 | 10/2019 | Harknett et al. |
| 2019/0390616 A1 | 12/2019 | Del Valle Echavarri et al. |
| 2020/0032722 A1* | 1/2020 | Klüting .................. F02D 19/023 |
| 2020/0284364 A1 | 9/2020 | Yu |
| 2020/0408155 A1 | 12/2020 | Sanders et al. |
| 2021/0071557 A1 | 3/2021 | Renault |
| 2021/0231062 A1 | 7/2021 | Lundgren |
| 2021/0310430 A1 | 10/2021 | Fisher et al. |
| 2021/0404371 A1 | 12/2021 | Yerace et al. |
| 2022/0099049 A1 | 3/2022 | Walser et al. |
| 2022/0136451 A1 | 5/2022 | Guglielmo et al. |
| 2022/0170409 A1 | 6/2022 | Lee et al. |
| 2022/0178318 A1 | 6/2022 | Schiltz et al. |
| 2023/0054901 A1* | 2/2023 | Wolk .................. F02M 21/0218 |
| 2023/0064061 A1* | 3/2023 | Matsukawa ...... F02M 35/10157 |
| 2023/0064208 A1* | 3/2023 | Matsukawa ......... F02D 41/0027 |
| 2023/0068444 A1* | 3/2023 | Matsukawa ........... F02D 19/081 |
| 2023/0068586 A1* | 3/2023 | Matsukawa ...... F02M 35/10157 |
| 2023/0070025 A1* | 3/2023 | Matsukawa ......... F02D 19/0607 |
| 2023/0101065 A1* | 3/2023 | Matsukawa ......... F02D 19/0605 |
| | | 123/527 |

FOREIGN PATENT DOCUMENTS

| | | | | |
|---|---|---|---|---|
| CN | 110023613 A | * | 7/2019 | ........... F02D 19/023 |
| DE | 10008959 A1 | * | 8/2001 | ........... F02B 29/0437 |
| DE | 10 2009 017 223 A1 | | 10/2010 | |
| DE | 102016121006 A1 | * | 5/2017 | ............ B01F 5/0413 |
| EP | 102119 A | * | 3/1984 | ......... F02D 19/0605 |
| EP | 1128053 A2 | * | 8/2001 | ........... F02B 29/0437 |
| EP | 4137685 A1 | * | 2/2023 | ......... F02M 21/0215 |
| FR | 888096 A | | 12/1943 | |
| FR | 2546231 A1 | | 11/1984 | |
| GB | 1 182 882 | | 3/1970 | |
| GB | 1 192 275 A | | 5/1970 | |
| GB | 2544325 A | * | 5/2017 | ............ B01F 5/0413 |
| JP | 59-037251 A | | 2/1984 | |
| JP | 5996464 A | | 6/1984 | |
| JP | 59-221440 A | | 12/1984 | |
| JP | 60-017260 A | | 1/1985 | |
| JP | 2000-303909 A | | 10/2000 | |
| JP | 2011-017333 A | | 1/2011 | |
| JP | 4767458 B2 | | 9/2011 | |
| KR | 20000003102 A | | 1/2000 | |
| KR | 20040017643 A | | 2/2004 | |
| KR | 102389088 B1 | | 4/2022 | |
| WO | WO-2006/010809 | | 2/2006 | |
| WO | WO-2012/017856 A1 | | 2/2012 | |
| WO | WO-2014/026778 A1 | | 2/2014 | |

* cited by examiner

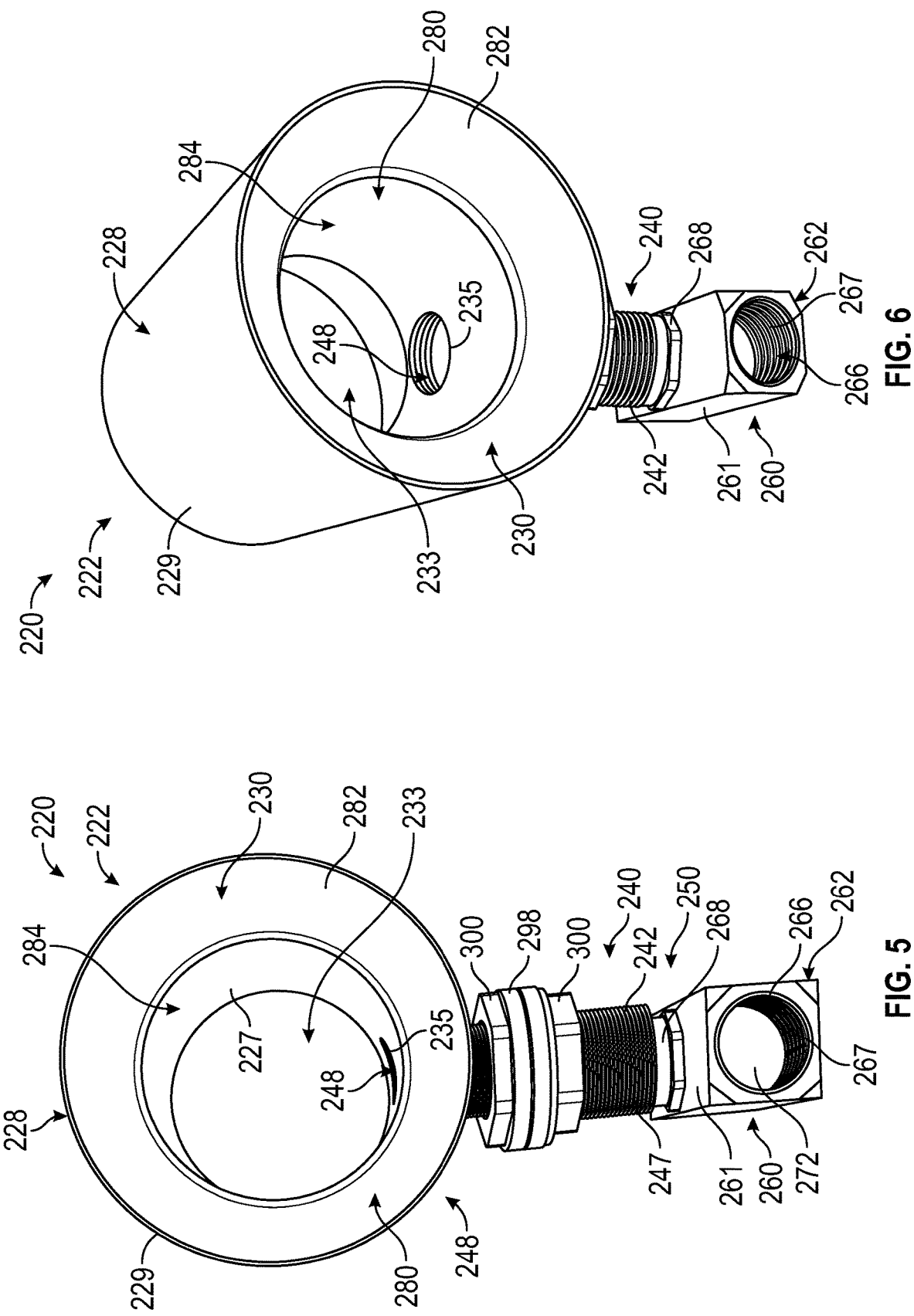

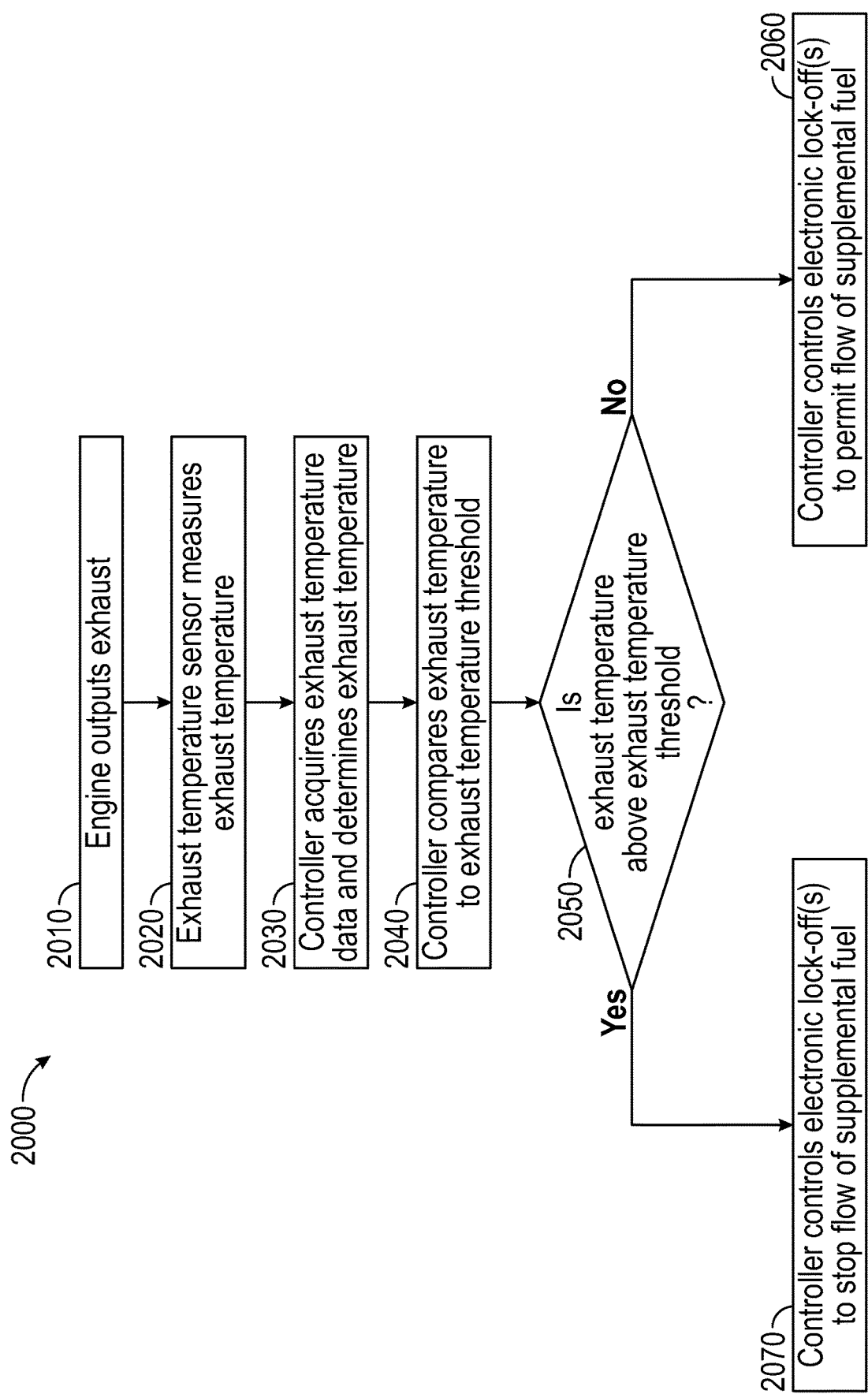

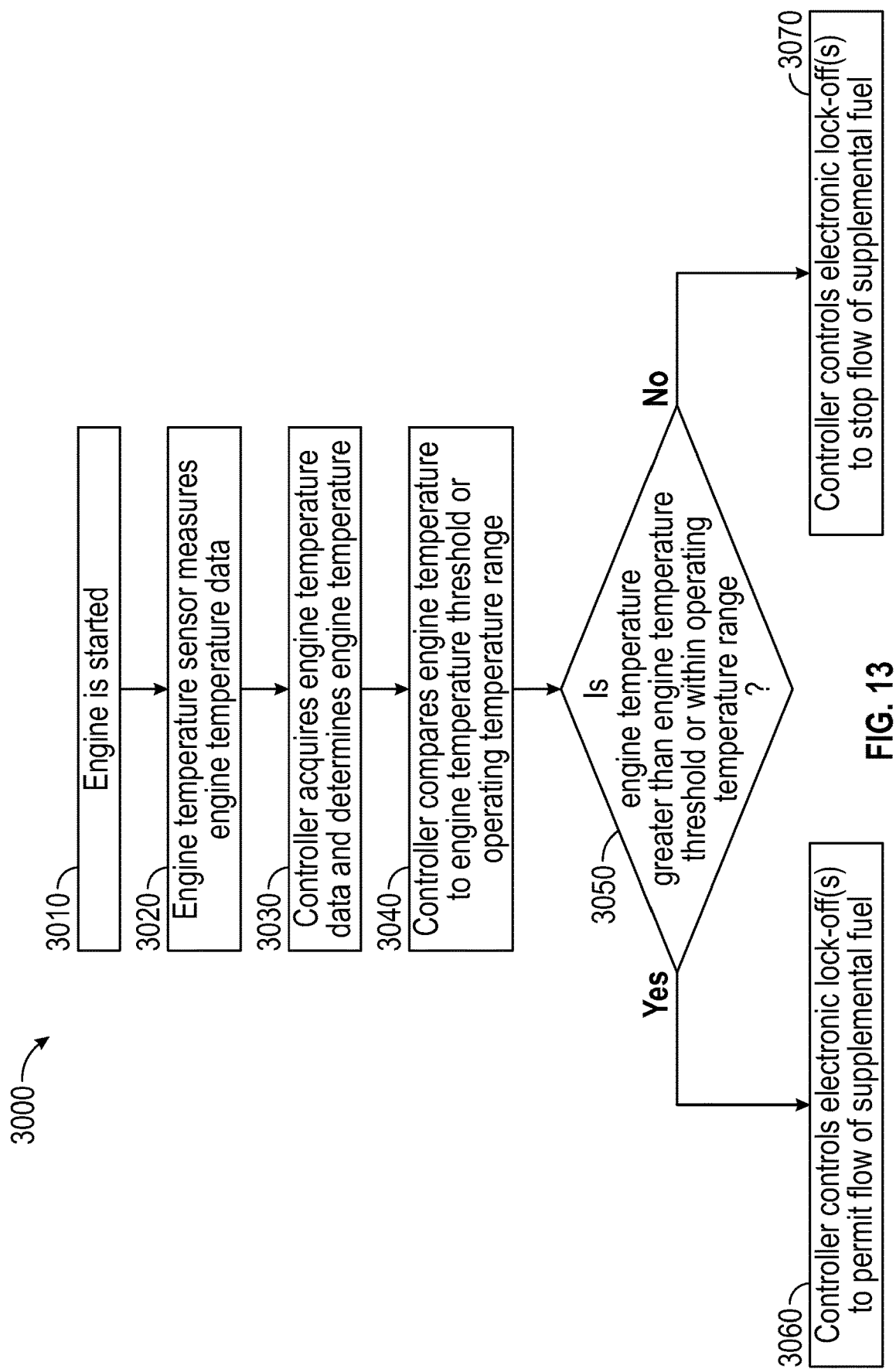

SUPPLEMENTAL FUEL SYSTEM FOR COMPRESSION-IGNITION ENGINE

CROSS-REFERENCE TO RELATED PATENT APPLICATIONS

This application claims the benefit of and priority to (a) U.S. Provisional Patent Application No. 62/497,357, filed Sep. 1, 2021, (b) U.S. Provisional Patent Application No. 63/324,224, filed Mar. 28, 2022, (c) U.S. Provisional Patent Application No. 63/324,230, filed Mar. 28, 2022, (d) U.S. Provisional Patent Application No. 63/324,231, filed Mar. 28, 2022, (e) U.S. Provisional Patent Application No. 63/324,306, filed Mar. 28, 2022, (f) U.S. Provisional Patent Application No. 63/324,411, filed Mar. 28, 2022, (g) U.S. Provisional Patent Application No. 63/324,420, filed Mar. 28, 2022, and (h) U.S. Provisional Patent Application No. 63/324,447, filed Mar. 28, 2022, all of which are incorporated herein by reference in their entireties.

BACKGROUND

Compression-ignition internal combustion engines (e.g., diesel engines) typically include a fuel tank fluidly connected to a fuel injector that is configured to supply (e.g., spray) a combustible fuel (e.g., diesel) from the fuel tank into a charge of heated and compressed air within an engine cylinder. The high temperature and high pressure of the charge of heated and compressed air within the engine cylinder causes the fuel injected therein to ignite and expand, which drives subsequent stages of the engine cycle (e.g., the power stroke). Compression-ignition internal combustion engines are often compatible with a variety of fuels due to the high engine temperatures achieved within the engine cylinder(s) during operation. Accordingly, a large number and variety of fuels and/or combinations of fuels may be suitable for use within a compression-ignition internal combustion engine.

For example, natural gas and other gaseous fuels have been used as a dedicated fuel, or blended fuel supplement in diesel engines for decades. There are existing "conversion kits" on the market today that deliver natural gas, propane, or other supplemental fuel to diesel engines.

However, such conversion kits available today are designed for a specific engine or vehicle, rendering the conversion kits useless for engines or vehicles that they were not specifically designed to supplement. Such engine or vehicle specific kits lead to unfamiliarity by the installing technicians, which can make the kits complex to install, difficult to properly tune, and can lead to engine damage.

SUMMARY

One embodiment relates to a supplemental fuel system for a machine having a compression-ignition engine. The supplemental fuel system includes a fuel mixer. The fuel mixer includes a nozzle and a stem. The nozzle is configured to be positioned within a conduit of an air supply system for the compression-ignition engine. The nozzle has a body defining a first inlet positioned at a first nozzle end thereof, an outlet positioned at an opposing second nozzle end thereof, a second inlet positioned between the first nozzle end and the opposing second nozzle end, and a nozzle passage extending from the first nozzle end to the opposing second nozzle end that is configured to receive air flowing through the conduit. The stem has a first stem end and a second stem end. The first stem end interfaces with the second inlet. The stem is configured to extend through a wall of the conduit such that the second stem end is positioned outside of the conduit. The stem is configured to receive a supplemental fuel from a supplemental fuel tank and provide the supplemental fuel to the nozzle passage of the nozzle through the second inlet.

Another embodiment relates to a supplemental fuel system for a machine having a compression-ignition engine. The supplemental fuel system includes a nozzle configured to be positioned within a conduit of an air supply system for the compression-ignition engine. The nozzle has a first inlet positioned at a first end thereof, an outlet positioned at an opposing second end thereof, a nozzle passage extending from the first end to the opposing second end, and a second inlet. The nozzle passage is configured to receive air flowing through the conduit. The nozzle passage has a non-uniform profile with a first transition point, a second transition point, an inlet taper extending from the first end to the first transition point, a mixing chamber positioned between the first transition point and the second transition point, and an outlet taper extending from the second transition point to the opposing second end. The second inlet is positioned along the mixing chamber closer to the second transition point than the first transition point. The inlet taper has a first longitudinal length and the outlet taper has a second longitudinal length. A ratio of the second longitudinal length to the first longitudinal length is about 3:1. The nozzle is configured to generate a vacuum signal at the second inlet as the air flowing through the conduit flows through the nozzle passage to draw a flow of supplemental fuel from a supplemental fuel source into the mixing chamber.

Another embodiment relates to a supplemental fuel system for a machine having a compression-ignition engine. The supplemental fuel system includes a nozzle, a stem, and a valve assembly. The nozzle is configured to be positioned within a conduit of an air supply system for the compression-ignition engine. The nozzle has a first inlet positioned at a first nozzle end thereof, an outlet positioned at an opposing second nozzle end thereof, a nozzle passage extending from the first nozzle end to the opposing second nozzle end, and a second inlet. The nozzle passage is configured to receive air flowing through the conduit. The nozzle passage has a non-uniform profile with a first transition point, a second transition point, an inlet taper extending from the first nozzle end to the first transition point, a mixing chamber positioned between the first transition point and the second transition point, and an outlet taper extending from the second transition point to the opposing second nozzle end. The inlet taper is different than the outlet taper. The second inlet is positioned along the mixing chamber. The stem has a first stem end and a second stem end. The first stem end interfaces with the second inlet. The stem is configured to extend through a wall of the conduit such that the second stem end is positioned outside of the conduit. The valve assembly includes a valve body and an adjuster. The valve body defines a valve body inlet configured to receive a supplemental fuel from a supplemental fuel source and a valve body outlet interfacing with the second stem end of the stem. The adjuster is positioned to facilitate selectively restricting an amount of flow of the supplemental fuel through the valve body outlet to the stem and the nozzle. The nozzle is configured to generate a vacuum signal at the second inlet as the air flowing through the conduit flows through the nozzle passage to draw a flow of the supplemental fuel through the valve assembly and the stem into the mixing chamber.

Another embodiment relates to a supplemental fuel system for a machine having a compression-ignition engine. The supplemental fuel system includes a supplemental fuel tank, a first pressure regulator, a second pressure regulator, a nozzle, an electronic lock off valve, and a controller. The supplemental fuel tank is configured to store a supplemental fuel at a first pressure. The supplemental fuel is configured to supplement a primary fuel used by the compression-ignition engine. The first pressure regulator is configured to be positioned downstream of the supplemental fuel tank. The first pressure regulator is configured to reduce the first pressure of the supplemental fuel received from the supplemental fuel tank to a second pressure. The second pressure regulator is configured to be positioned downstream of the first pressure regulator. The second pressure regulator is configured to reduce the second pressure of the supplemental fuel received from the first pressure regulator to a third pressure. The nozzle is configured to be positioned (i) downstream of the second pressure regulator and (ii) within a conduit of an air supply system for the compression-ignition engine. The nozzle is configured to receive a flow of the supplemental fuel and provide the supplemental fuel to air flowing though the conduit. The electronic lock off valve is configured to be positioned between the supplemental fuel tank and the nozzle. The controller is configured to control the electronic lock off valve to selectively disengage the supplemental fuel system and prevent the supplemental fuel from being provided to the air flowing through the conduit.

Another embodiment relates to a supplemental fuel system for a machine having a compression-ignition engine. The supplemental fuel system includes a supplemental fuel tank, a first pressure regulator, a second pressure regulator, and a fuel mixer. The supplemental fuel tank is configured to store a supplemental fuel at a first pressure. The supplemental fuel is configured to supplement a primary fuel used by the compression-ignition engine. The first pressure regulator is configured to be positioned downstream of the supplemental fuel tank. The first pressure regulator is configured to reduce the first pressure of the supplemental fuel received from the supplemental fuel tank to a second pressure. The second pressure regulator is configured to be positioned downstream of the first pressure regulator. The second pressure regulator id configured to reduce the second pressure of the supplemental fuel received from the first pressure regulator to a third pressure. The fuel mixer is configured to be positioned downstream of the second pressure regulator. The fuel mixer includes a valve body, an adjuster, a stem, and a Venturi nozzle. The valve body defines a valve body inlet and a valve body outlet. The valve body inlet is configured to receive a flow of the supplemental fuel from the second pressure regulator. The adjuster is positioned to facilitate selectively restricting an amount of the flow of the supplemental fuel through the valve body outlet. The stem has a first stem end and a second stem end. The first stem end interfaces with the valve body outlet. The stem is configured to extend through a wall of a conduit of an air supply system for the compression-ignition engine such that the second stem end is positioned inside of the conduit. The Venturi nozzle interfaces with the second stem end of the stem and is configured to be positioned within the conduit. The Venturi nozzle is configured to receive at least a portion of air flowing through the conduit and generate a vacuum signal at the second pressure regulator as the at least the portion of air flows through the Venturi nozzle. The Venturi nozzle is configured to (i) receive the flow of the supplemental fuel from the second pressure regulator in response to and based on the vacuum signal and (ii) mix the flow of the supplemental fuel with the at least the portion of air.

Another embodiment relates to a supplemental fuel system for a machine having a compression-ignition engine. The supplemental fuel system includes a supplemental fuel tank, a first pressure regulator, a second pressure regulator, a fuel mixer, an electronic lock off valve, and controller. The supplemental fuel tank I s configured to store a supplemental fuel at a first pressure. The supplemental fuel is configured to supplement a primary fuel used by the compression-ignition engine. The first pressure regulator is configured to be positioned downstream of the supplemental fuel tank. The first pressure regulator is configured to reduce the first pressure of the supplemental fuel received from the supplemental fuel tank to a second pressure. The second pressure regulator is configured to be positioned downstream of the first pressure regulator. The second pressure regulator is configured to reduce the second pressure of the supplemental fuel received from the first pressure regulator to a third pressure. The fuel mixer is configured to be positioned downstream of the second pressure regulator. The fuel mixer includes a valve body, an adjuster, a stem, and a Venturi nozzle. The valve body defines a valve body inlet and a valve body outlet. The valve body inlet is configured to receive a flow of the supplemental fuel from the second pressure regulator. The adjuster is positioned to facilitate selectively restricting an amount of the flow of the supplemental fuel through the valve body outlet. The stem has a first stem end and a second stem end. The first stem end interfaces with the valve body outlet. The stem is configured to extend through a wall of a conduit of an air supply system for the compression-ignition engine such that the second stem end is positioned inside of the conduit. The Venturi nozzle interfaces with the second stem end of the stem and is configured to be positioned within the conduit. The Venturi nozzle is configured to receive at least a portion of air flowing through the conduit and generate a vacuum signal at the second pressure regulator as the at least the portion of air flows through the Venturi nozzle. The Venturi nozzle is configured to (i) receive the flow of the supplemental fuel from the second pressure regulator in response to and based on the vacuum signal and (ii) mix the flow of the supplemental fuel with the at least the portion of air. The electronic lock off valve is configured to be positioned between the supplemental fuel tank and the fuel mixer. The controller is configured to control the electronic lock off valve to selectively prevent the supplemental fuel from being provided to the fuel mixer.

Another embodiment relates to a supplemental fuel system for a machine having a compression-ignition engine. The supplemental fuel system includes a fuel mixer. The fuel mixer includes a nozzle and a stem. The nozzle is configured to be positioned within a conduit of an air supply system for the compression-ignition engine. The nozzle has a body defining a first inlet, an outlet, a nozzle passage extending from the first inlet to the outlet, and a second inlet positioned between the first inlet and the outlet. The body has a first cross-sectional dimension that is configured to be less than a second cross-sectional dimension of the conduit such that (i) a first portion of air flowing through the conduit flows through the nozzle passage and (ii) a second portion of the air flowing through the conduit flows around the nozzle. The stem has a first stem end and a second stem end. The first stem end interfaces with the second inlet. The stem is configured to extend through a wall of the conduit such that the second stem end is positioned outside of the conduit. The stem is configured to receive a supplemental fuel from a supplemental fuel source and provide the supplemental fuel through the second inlet of the nozzle to the first portion of the air flowing through the nozzle passage of the nozzle.

Another embodiment relates to a supplemental fuel system for a machine having a compression-ignition engine. The supplemental fuel system includes a nozzle. The nozzle is configured to be positioned within a conduit of an air supply system for the compression-ignition engine. The nozzle has a passage with an inlet, a first transition point, a second transition point, an outlet, an inlet taper extending from the inlet to the first transition point, a mixing chamber positioned between the first transition point and the second transition point, and an outlet taper extending from the second transition point to the outlet. The nozzle has a second inlet positioned along the mixing chamber closer to the second transition point than the first transition point. The nozzle has a first cross-sectional dimension that is configured to be less than a second cross-sectional dimension of the conduit such that (i) a first portion of air flowing through the conduit flows through the passage and (ii) a second portion of the air flowing through the conduit flows around the nozzle. The inlet taper has a first longitudinal length and the outlet taper has a second longitudinal length. A ratio of the second longitudinal length to the first longitudinal length is about 3:1. The nozzle is configured to generate a vacuum signal at the second inlet as the first portion of the air flows through the passage to draw a flow of a supplemental fuel from a supplemental fuel source into the mixing chamber.

Another embodiment relates to a supplemental fuel system for a machine having a compression-ignition engine. The supplemental fuel system includes a nozzle, a stem, a valve body, and an adjuster. The nozzle is configured to be positioned within a conduit of an air supply system for the compression-ignition engine. The nozzle has a passage with an inlet, a first transition point, a second transition point, an outlet, an inlet taper extending from the inlet to the first transition point, a mixing chamber positioned between the first transition point and the second transition point, and an outlet taper extending from the second transition point to the outlet. The nozzle has a second inlet positioned along the mixing chamber closer to the second transition point than the first transition point. The nozzle has an outer diameter of about 3 inches, the mixing chamber has a chamber diameter of about 2 inches, the nozzle has a nozzle length of about 4 inches, the inlet taper has an inlet length of about 0.5 inches, the mixing chamber has a chamber length of about 2 inches, and the outlet taper has an outlet length of about 1.5 inches. The outer diameter is configured to be less than a cross-sectional dimension of the conduit such that (i) a first portion of air flowing through the conduit flows through the passage and (ii) a second portion of the air flowing through the conduit flows around the nozzle. The stem has a first stem end and a second stem end. The first stem end interfaces with the second inlet. The stem is configured to extend through a wall of the conduit such that the second stem end is positioned outside of the conduit. The valve body defines a valve body inlet configured to receive a supplemental fuel from a supplemental fuel source and a valve body outlet interfacing with the second stem end of the stem. The adjuster is positioned to facilitate selectively restricting an amount of the supplemental fuel through the valve body outlet to the stem and the nozzle. The nozzle is configured to generate a vacuum signal at the second inlet as the first portion of the air flows through the passage to draw a flow of the supplemental fuel into the mixing chamber.

Another embodiment relates to a supplemental fuel system for a machine having a compression-ignition engine. The supplemental fuel system includes an air intake tube. The air intake tube has a first end configured to interface with an air cleaner of an air supply system that provides air to the compression-ignition engine, a second end configured to interface with a compressor of a turbocharger of the air supply system, and a sidewall extending between the first end and the second end. The sidewall includes a fuel interface configured to facilitate providing a supplemental fuel into the air intake tube to mix with the air upstream of the compressor of the turbocharger.

Another embodiment relates to a supplemental fuel system for a machine having a compression-ignition engine. The supplemental fuel system includes an air intake tube, a stem, and a nozzle. The air intake tube has a first end configured to interface with an air cleaner of an air supply system that provides air to the compression-ignition engine, a second end configured to interface with a compressor of a turbocharger of the air supply system, and a sidewall extending between the first end and the second end. The stem extends through the sidewall between the first end and the second end. The stem is configured to couple to a supplemental fuel source. The nozzle is positioned within the air intake tube. The nozzle defines a nozzle passage that has an air inlet, an outlet, a first transition point, a second transition point, an inlet taper extending from the air inlet to the first transition point, a mixing chamber positioned between the first transition point and the second transition point, an outlet taper extending from the second transition point to the outlet, and a fuel inlet positioned along the mixing chamber and that interfaces with the stem. The nozzle has an outer diameter of about 3 inches, the mixing chamber has a chamber diameter of about 2 inches, the nozzle has a nozzle length of about 4 inches, the inlet taper has an inlet length of about 0.5 inches, the mixing chamber has a chamber length of about 2 inches, and the outlet taper has an outlet length of about 1.5 inches. The outer diameter is less than a cross-sectional dimension of the air intake tube such that (i) a first portion of the air flowing through the air intake tube flows through the nozzle passage and (ii) a second portion of the air flowing through the air intake tube flows around the nozzle. The nozzle is configured to generate a vacuum signal at the fuel inlet as the first portion of the air flows through the nozzle passage to facilitate drawing a supplemental fuel from the supplemental fuel source into the air intake tube to mix with the air upstream of the compressor of the turbocharger.

Another embodiment relates to a supplemental fuel system for a machine having a compression-ignition engine. The supplemental fuel system includes an air intake tube, a stem, and a nozzle. The air intake tube has a first end configured to interface with an air cleaner of an air supply system that provides air to the compression-ignition engine, a second end configured to interface with a compressor of a turbocharger of the air supply system, and a sidewall extending between the first end and the second end. The stem extends through the sidewall between the first end and the second end. The stem is configured to couple to a supplemental fuel source. The nozzle is positioned within the air intake tube. The nozzle defines an air inlet, a fuel inlet that interfaces with the stem, and an outlet. The nozzle is configured to generate a vacuum signal at the fuel inlet as the air flows through the nozzle to facilitate drawing a supplemental fuel from the supplemental fuel source into the air intake tube to mix with the air upstream of the compressor of the turbocharger.

Another embodiment relates to a supplemental fuel system for a machine having a compression-ignition engine. The supplemental fuel system includes a supplemental fuel tank, an electronic lock off valve, a voltage sensor, and a controller. The supplemental fuel tank is configured to store a supplemental fuel. The supplemental fuel is configured to supplement a primary fuel used by the compression-ignition engine. The electronic lock off valve is configured to be positioned between the supplemental fuel tank and an air supply system for the compression-ignition engine. The voltage sensor is configured to acquire voltage data from a power supply of the machine indicative of a voltage of the power supply. The power supply is configured to receive power from an alternator driven by the compression-ignition engine. The controller is configured to monitor the voltage of the power supply based on the voltage data acquired by the voltage sensor, compare the voltage to a voltage threshold, and control the electronic lock off valve such that the electronic lock off valve is (i) closed to prevent the supplemental fuel from being provided to the air supply system in response to the voltage being less than the voltage threshold and (ii) open or openable to permit the supplemental fuel to be provided to the air supply system in response to the voltage being greater than the voltage threshold.

Another embodiment relates to a supplemental fuel system for a machine having a compression-ignition engine. The supplemental fuel system includes an electronic lock off valve, voltage sensor, and a controller. The electronic lock off valve is configured to be positioned between a supplemental fuel tank and an air supply system for the compression-ignition engine. The supplemental fuel tank is configured to store a supplemental fuel that supplements a primary fuel used by the compression-ignition engine. The voltage sensor is configured to acquire voltage data from a power supply of the machine indicative of a voltage of the power supply. The power supply is configured to receive power from an alternator driven by the compression-ignition engine. The controller is configured to monitor the voltage of the power supply based on the voltage data acquired by the voltage sensor and control the electronic lock off valve such that the electronic lock off valve is closed to prevent the supplemental fuel from being provided to the air supply system in response to the voltage being less than a voltage threshold.

Another embodiment relates to a supplemental fuel system for a machine having a compression-ignition engine. The supplemental fuel system includes a supplemental fuel tank, a first pressure regulator, a second pressure regulator, a fuel mixer, an electronic lock off valve, a voltage sensor, and a controller. The supplemental fuel tank is configured to store a supplemental fuel. The supplemental fuel is configured to supplement a primary fuel used by the compression-ignition engine. The first pressure regulator is configured to be positioned downstream of the supplemental fuel tank. The first pressure regulator is configured to reduce a pressure of the supplemental fuel received from the supplemental fuel tank from a first pressure to a second pressure. The second pressure regulator is configured to be positioned downstream of the first pressure regulator. The second pressure regulator is configured to reduce the pressure of the supplemental fuel received from the first pressure regulator from the second pressure to a third pressure. The fuel mixer is configured to be positioned downstream of the second pressure regulator. The fuel mixer includes a nozzle, a stem, and a valve assembly. The nozzle is configured to be positioned within a conduit of an air supply system for the compression-ignition engine. The nozzle is configured to receive a flow of the supplemental fuel and provide the supplemental fuel to air flowing through the conduit. The stem is configured to extend through a wall of the conduit and interface with the nozzle. The valve assembly includes a valve body and an adjuster. The valve body defines a valve body inlet configured to receive the flow of the supplemental fuel from the second pressure regulator and a valve body outlet interfacing with the stem. The adjuster is positioned to facilitate selectively restricting an amount of the flow of the supplemental fuel through the valve body outlet and provided to the stem and the nozzle. The electronic lock off valve is configured to be positioned between the supplemental fuel tank and the fuel mixer. The voltage sensor is configured to acquire voltage data from a power supply of the machine indicative of a voltage of the power supply. The power supply is configured to receive power from an alternator driven by the compression-ignition engine. The controller is configured to monitor the voltage of the power supply based on the voltage data acquired by the voltage sensor, compare the voltage to a voltage threshold, and control the electronic lock off valve such that the electronic lock off valve is (i) closed to prevent the supplemental fuel from being provided to the air supply system in response to the voltage being less than the voltage threshold and (ii) open or openable to permit the supplemental fuel to be provided to the air supply system in response to the voltage being greater than the voltage threshold.

Another embodiment relates to a supplemental fuel system for a machine having a compression-ignition engine. The supplemental fuel system includes a supplemental fuel tank, an electronic lock off valve, a temperature sensor, and a controller. The supplemental fuel tank is configured to store a supplemental fuel. The supplemental fuel is configured to supplement a primary fuel used by the compression-ignition engine. The electronic lock off valve is configured to be positioned between the supplemental fuel tank and an air supply system for the compression-ignition engine. The temperature sensor is configured to acquire temperature data regarding a temperature of exhaust gas output by the compression-ignition engine. The controller is configured to monitor the temperature of the exhaust gas based on the temperature data acquired by the temperature sensor, compare the temperature to a temperature threshold, and control the electronic lock off valve such that the electronic lock off valve is (i) closed to prevent the supplemental fuel from being provided to the air supply system in response to the temperature being greater than the temperature threshold and (ii) open or openable to permit the supplemental fuel to be provided to the air supply system in response to the temperature being less than the temperature threshold.

Another embodiment relates to a supplemental fuel system for a machine having a compression-ignition engine. The supplemental fuel system includes an electronic lock off valve, a temperature sensor, and a controller. The electronic lock off valve is configured to be positioned between a supplemental fuel tank and an air supply system for the compression-ignition engine. The supplemental fuel tank is configured to store a supplemental fuel that supplements a primary fuel used by the compression-ignition engine. The temperature sensor is configured to acquire temperature data regarding a temperature of exhaust gas output by the compression-ignition engine. The controller is configured to monitor the temperature of the exhaust gas based on the temperature data acquired by the temperature sensor and control the electronic lock off valve such that the electronic lock off valve is closed to prevent the supplemental fuel from being provided to the air supply system in response to the temperature being greater than a temperature threshold.

Another embodiment relates to a supplemental fuel system for a machine having a compression-ignition engine. The supplemental fuel system includes a supplemental fuel tank, a first pressure regulator, a second pressure regulator, a fuel mixer, an electronic lock off valve, a temperature sensor, and a controller. The supplemental fuel tank is configured to store a supplemental fuel. The supplemental fuel is configured to supplement a primary fuel used by the compression-ignition engine. The first pressure regulator is configured to be positioned downstream of the supplemental fuel tank. The first pressure regulator is configured to reduce a pressure of the supplemental fuel received from the supplemental fuel tank from a first pressure to a second pressure. The second pressure regulator is configured to be positioned downstream of the first pressure regulator. The second pressure regulator is configured to reduce the pressure of the supplemental fuel received from the first pressure regulator from the second pressure to a third pressure. The fuel mixer is configured to be positioned downstream of the second pressure regulator. The fuel mixer includes a nozzle, a stem, and a valve assembly. The nozzle is configured to be positioned within a conduit of an air supply system for the compression-ignition engine. The nozzle is configured to receive a flow of the supplemental fuel and provide the supplemental fuel to air flowing through the conduit. The stem is configured to extend through a wall of the conduit and interface with the nozzle. The valve assembly includes a valve body and an adjuster. The valve body defines a valve body inlet configured to receive the flow of the supplemental fuel from the second pressure regulator and a valve body outlet interfacing with the stem. The adjuster is positioned to facilitate selectively restricting an amount of the flow of the supplemental fuel through the valve body outlet and provided to the stem and the nozzle. The electronic lock off valve is configured to be positioned between the supplemental fuel tank and the fuel mixer. The temperature sensor is configured to acquire temperature data regarding a temperature of exhaust gas output by the compression-ignition engine. The controller is configured to monitor the temperature of the exhaust gas based on the temperature data acquired by the temperature sensor, compare the temperature to a temperature threshold, and control the electronic lock off valve such that the electronic lock off valve is (i) closed to prevent the supplemental fuel from being provided to the air supply system in response to the temperature being greater than the temperature threshold and (ii) open or openable to permit the supplemental fuel to be provided to the air supply system in response to the temperature being less than the temperature threshold.

Another embodiment relates to a supplemental fuel system for a machine having a compression-ignition engine. The supplemental fuel system includes a supplemental fuel tank, an electronic lock off valve, a temperature sensor, and a controller. The supplemental fuel tank is configured to store a supplemental fuel. The supplemental fuel is configured to supplement a primary fuel used by the compression-ignition engine. The electronic lock off valve is configured to be positioned between the supplemental fuel tank and an air supply system for the compression-ignition engine. The temperature sensor is configured to acquire temperature data regarding a temperature of the compression-ignition engine. The controller is configured to monitor the temperature of the compression-ignition engine based on the temperature data acquired by the temperature sensor, compare the temperature to a temperature threshold, and control the electronic lock off valve such that the electronic lock off valve is (i) closed to prevent the supplemental fuel from being provided to the air supply system in response to the temperature being less than the temperature threshold and (ii) open or openable to permit the supplemental fuel to be provided to the air supply system in response to the temperature being greater than the temperature threshold.

Another embodiment relates to a supplemental fuel system for a machine having a compression-ignition engine. The supplemental fuel system includes an electronic lock off valve, a temperature sensor, and a controller. The electronic lock off valve is configured to be positioned between a supplemental fuel tank and an air supply system for the compression-ignition engine. The supplemental fuel tank is configured to store a supplemental fuel that supplements a primary fuel used by the compression-ignition engine. The temperature sensor is configured to acquire temperature data regarding a temperature of the compression-ignition engine. The controller is configured to monitor the temperature of the compression-ignition engine based on the temperature data acquired by the temperature sensor and control the electronic lock off valve such that the electronic lock off valve is closed to prevent the supplemental fuel from being provided to the air supply system in response to the temperature being less than a temperature threshold.

Still another embodiment relates to a supplemental fuel system for a machine having a compression-ignition engine. The supplemental fuel system includes a supplemental fuel tank, a first pressure regulator, a second pressure regulator, a fuel mixer, an electronic lock off valve, a temperature sensor, and a controller. The supplemental fuel tank is configured to store a supplemental fuel. The supplemental fuel is configured to supplement a primary fuel used by the compression-ignition engine. The first pressure regulator is configured to be positioned downstream of the supplemental fuel tank. The first pressure regulator is configured to reduce a pressure of the supplemental fuel received from the supplemental fuel tank from a first pressure to a second pressure. The second pressure regulator is configured to be positioned downstream of the first pressure regulator. The second pressure regulator is configured to reduce the pressure of the supplemental fuel received from the first pressure regulator from the second pressure to a third pressure. The fuel mixer is configured to be positioned downstream of the second pressure regulator. The fuel mixer includes a nozzle, a stem, and a valve assembly. The nozzle is configured to be positioned within a conduit of an air supply system for the compression-ignition engine. The nozzle is configured to receive a flow of the supplemental fuel and provide the supplemental fuel to air flowing through the conduit. The stem is configured to extend through a wall of the conduit and interface with the nozzle. The valve assembly includes (i) a valve body defining (a) a valve body inlet configured to receive the flow of the supplemental fuel from the second pressure regulator and (b) a valve body outlet interfacing with the stem and (ii) an adjuster positioned to facilitate selectively restricting an amount of the flow of the supplemental fuel through the valve body outlet and provided to the stem and the nozzle. The electronic lock off valve is configured to be positioned between the supplemental fuel tank and the fuel mixer. The temperature sensor is configured to acquire temperature data regarding a temperature of the compression-ignition engine. The controller is configured to monitor the temperature of the compression-ignition engine based on the temperature data acquired by the temperature sensor, compare the temperature to a temperature range, and control the electronic lock off valve such that the electronic lock off valve is closed to prevent the supplemental fuel from being provided to the air supply system in response to the temperature being outside of the temperature range.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 5 is a front perspective view of the portion of the second fuel system of FIG. 4, according to an exemplary embodiment.

FIG. 6 is another front perspective view of the portion of the second fuel system of FIG. 4, according to an exemplary embodiment.

FIG. 12 is a flow diagram of a method for controlling the second fuel system of FIG. 1 based on exhaust temperature monitoring, according to an exemplary embodiment.

FIG. 13 is a flow diagram of a method for controlling the second fuel system of FIG. 1 based on engine temperature monitoring, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a supplemental fuel system of the present disclosure facilitates supplementing a primary fuel system (e.g., a liquid fuel system, a diesel fuel system, etc.) with a supplemental fuel such as natural gas, propane, methane, or other fuel. The supplemental fuel system may include at least one fuel mixer configured to be at least partially disposed within an air supply system (e.g., in a conduit of the air supply system) of a vehicle. The fuel mixer may include a Venturi nozzle configured to generate a vacuum signal to draw a low pressure supply of gaseous supplemental fuel into the air supply system, which is ultimately mixed with the primary fuel (e.g., diesel) in the combustion chamber of the engine of the vehicle. In this manner, a supplemental gaseous fuel may be provided to the engine, which may reduce the rate of consumption of the primary fuel of the primary fuel system, reduce fueling costs, and improve engine performance. According to an exemplary embodiment, the supplemental fuel system is configured as a universal conversion kit that can be retrofitted onto any compression-ignition driven system or vehicle. Therefore, the supplemental fuel system of the present disclosure eliminates the need to buy specific conversion kits for each different vehicle or system.

Overall System

Figure 1:
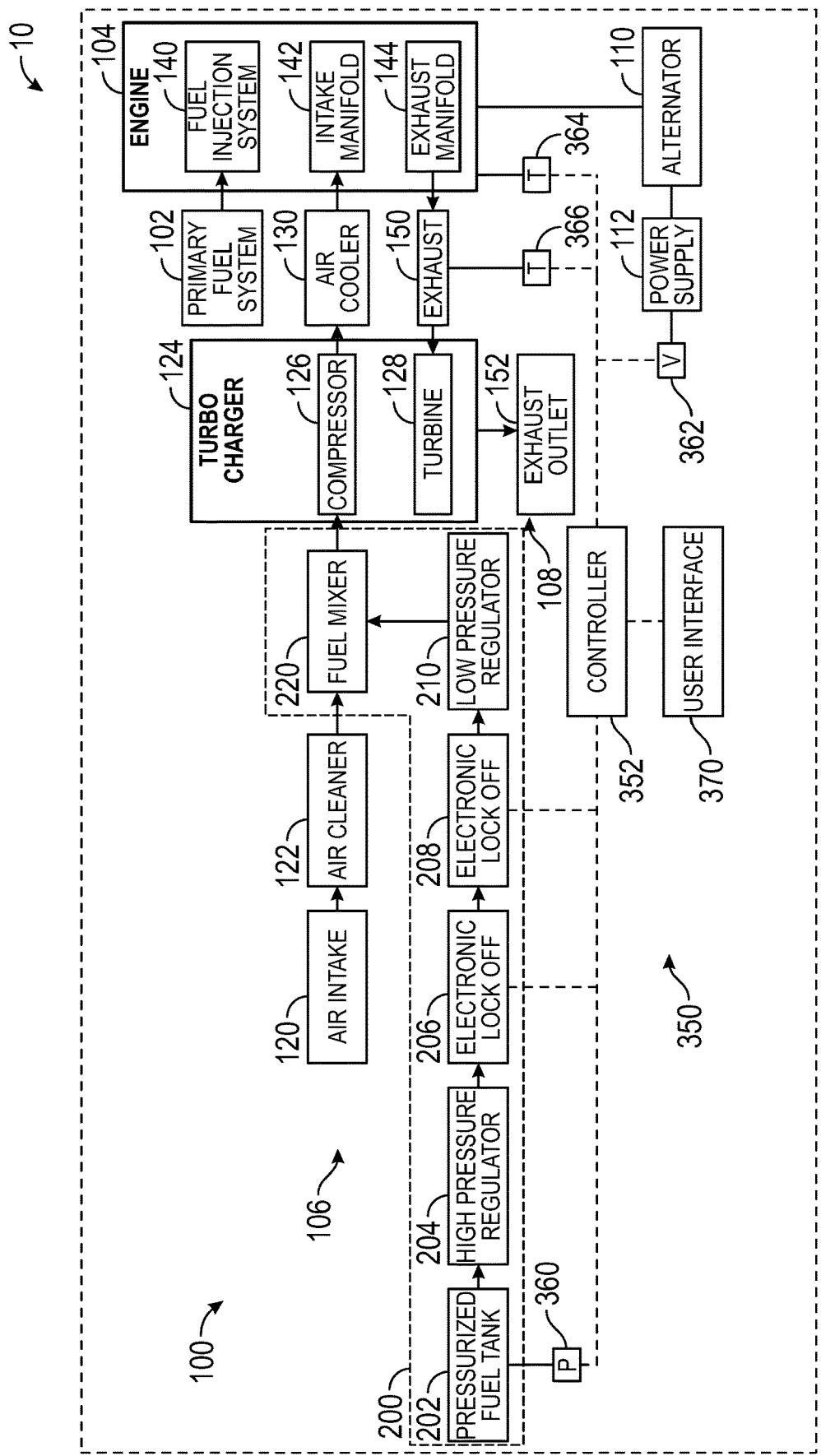
FIG. 1 is schematic block diagram of a machine having a first fuel system, an air supply system, and a second fuel system, according to an exemplary embodiment.

As shown in FIG. 1, a machine, shown as vehicle 10, includes a vehicle driveline, shown as driveline 100. Generally, the driveline 100 includes a first fueling system, shown as primary fuel system 102, a prime mover, shown as engine 104, an inflow system, shown as air supply system 106, an outflow system, shown as exhaust system 108, an electrical energy generator, shown as alternator 110, a power supply system, shown as power supply 112, a second fueling system, shown as supplemental fuel system 200, and a control system, shown as supplemental fuel control system 350. According to an exemplary embodiment, the engine 104 is configured to consume a first or primary fuel provided by the primary fuel system 102 and a second, different or supplemental fuel provided by the supplemental fuel system 200 to power the vehicle 10. In some embodiments, the supplemental fuel system 200 and the supplemental fuel control system 350 are provided as a retrofit or conversion kit to be installed onto the vehicle 10 post-production. In some embodiments, the supplemental fuel system 200 and the supplemental fuel control system 350 are installed by an original equipment manufacturer ("OEM") during the production of the vehicle 10.

In some embodiments, the vehicle 10 is an on-road vehicle. By way of example, the vehicle 10 may be a semi-tractor, a truck, a passenger vehicle, a refuse vehicle, a concrete mixer vehicle, a response vehicle, a tow truck, a bucket truck, and/or another type of on-road vehicle. In some embodiments, the vehicle 10 is an off-road vehicle. By way of example, the vehicle 10 may be mining machinery, agricultural machinery, construction machinery, marine vehicles, and/or another type of off-road vehicle. In some embodiments, the vehicle 10 includes a chassis supported by one or more tractive elements (e.g., wheels, tracks, etc.). The tractive elements may be configured to facilitate motion of the vehicle 10. In some embodiments, the machine is a partially or fully stationary system, rather than a vehicle. For example, the machine may be configured as a stationary or portable electrical generator.

According to an exemplary embodiment, the engine 104 is or includes a compression-ignition internal combustion engine. For example, the engine 104 may be or may include a diesel engine. The engine 104 may be configured to convert energy stored in at least one fuel into a mechanical force (e.g., a rotational force). For example, the engine 104 may include one or more cylinders and one or more pistons movable within the one or more cylinders to rotate an output shaft (e.g., a crankshaft). In some embodiments, one or more mechanical output devices (e.g., the alternator 110, a transmission, driveshaft, one or more axles, one or more tractive elements, a hybrid drive system, a hybrid battery charger/ generator, an accessory, etc.) are mechanically driven by the engine 104.

According to an exemplary embodiment, the primary fuel system 102 is configured to store and provide a first or primary fuel to the engine 104. The primary fuel system 102 may include a plurality of components to store and provide the first or primary fuel to the engine 104. By way of example, the primary fuel system 102 may include a fuel storage device (e.g., a fuel tank, a fuel container, etc.), a water separator (e.g., a fuel water separator), a fuel filter, a fuel pump, and/or still other fueling system components. The plurality of components of the primary fuel system 102 may be fluidly coupled. The fuel storage device may store, contain, or hold the first or primary fuel (e.g., a liquid fuel such as diesel, biodiesel, SVO, kerosene, mixtures thereof, and/or any other suitable liquid fuel for use in a compression-ignition combustion engine). The fuel storage device may include an inlet and an outlet. The inlet of the fuel storage device may facilitate a user manipulating the fuel and/or a quantity of fuel in the fuel storage device. For example, a user may add fuel or add an additive to the fuel storage device through the inlet.

In some embodiments, the fuel storage device is fluidly connected to the water separator, the fuel filter, and/or the fuel pump. The water separator may be configured to at least partially remove water from the first or primary fuel. The fuel filter may be configured to at least partially remove particulates or debris within the first or primary fuel. The fuel pump may be configured to pump the first or primary fuel from the fuel storage device and through the primary fuel system 102 to the engine 104 (e.g., a fuel injector system thereof). The fuel pump may be in communication with a controller (e.g., an engine controller, a microprocessor, a processing circuit, etc.).

As shown in FIG. 1, the air supply system 106 includes one or more air inlets, shown as air intake 120, a cleaning device (e.g., a purifying device, a fluid cleaning device, etc.), shown as air cleaner 122, a forced induction device, shown as turbocharger 124, and a heat exchanger (e.g., air-to-air cooler, an aftercooler, a charged cooler, a turbo cooler, an intercooler, a charge air cooler, a radiator, etc.), shown as air cooler 130. The components of the air supply system 106 (e.g., the air intake 120, the air cleaner 122, the turbocharger 124, the air cooler 130, etc.) may be fluidly connected by one or more conduits (e.g., pipes, tubes, etc.). As shown in FIG. 1, the air intake 120, the air cleaner 122, the turbocharger 124, and the air cooler 130 are arranged in series such that air received by the air intake 120 flows sequentially through the air intake 120, the air cleaner 122, the turbocharger 124, and the air cooler 130 before ultimately being provided to and received by the engine 104. In some embodiments, one or more of the components of the air supply system 106 are arranged differently (e.g., in parallel, in a different order, etc.).

According to an exemplary embodiment, the air cleaner 122 is configured to remove debris and/or particulate matter from the air entering the air supply system 106. For example, the air cleaner 122 may be or may include at least one of a dry air cleaner (e.g., a paper filter air cleaner, a mesh air cleaner, a wire air cleaner, etc.), a fluid enhanced (e.g., oil) air cleaner (e.g., an oil wetted air cleaner, an oil bath air cleaner, etc.), a mechanical air filter (e.g., a centrifugal air cleaner), or another suitable air cleaner. In some embodiments, the air cleaner 122 includes or defines the air intake 120. In other embodiments, the air intake 120 is or includes an inlet (e.g., opening) and/or a conduit including an air inlet (e.g., a vehicle snorkel, a hood scoop, an intake cowl, etc.).

As shown in FIG. 1, the turbocharger 124 includes a first or air side device, shown as compressor 126, and a second or exhaust side device, shown as turbine 128. The compressor 126 is positioned along the air supply system 106 between the air cleaner 122 and the air cooler 130, upstream of the engine 104. The turbine 128 is positioned along the exhaust system 108, downstream of the engine 104. The compressor 126 may include (i) a first or compressor housing that defines a first or compressor inlet and a first or compressor outlet and (ii) a first or compressor wheel disposed within the compressor housing. The turbine 128 may include (i) a second or turbine housing that defines a second or turbine inlet and a second or turbine outlet and (ii) a second or turbine wheel disposed within the turbine housing. The compressor wheel of the compressor 126 may be coupled to the turbine wheel of the turbine 128. For example, the turbine wheel and the compressor wheel may be rotatably coupled by a rigid member or shaft. The shaft may be supported by one or more bearings of the turbocharger 124. According to an exemplary embodiment, the turbine 128 is configured to be driven by exhaust gases received from the exhaust system 108, which causes the compressor 126 draw in air through the air supply system 106 into the compressor inlet of the compressor housing and output compressed air at a higher pressure and temperature through the compressor outlet of the compressor housing.

In some embodiments, the air supply system 106 additionally or alternatively includes a supercharger (e.g., an engine-powered compressor). In some embodiments, the air supply system 106 includes two or more forced induction devices (e.g., turbochargers, superchargers, etc.), which may be located in parallel or in series with each other. For example, the turbocharger 124 may be or may include a twin turbocharger configuration. In some embodiments, the engine 104 is naturally aspirated.

As shown in FIG. 1, an inlet of the air cooler 130 is fluidly coupled to the compressor outlet of the compressor 126 of the turbocharger 124. According to an exemplary embodiment, the air cooler 130 includes one or more heat exchangers configured to cool the compressed air received from the compressor 126 of the turbocharger 124 as the compressed air flows through the air cooler 130. In one embodiment, the air cooler 130 includes a conduit extending between the inlet and an outlet thereof that is configured to direct the compressed air received from the compressor 126 through one or more heat transfer devices (e.g., fins, tubes, pipes, etc.), which are configured (e.g., shaped, sized, etc.) to extract heat therefrom. In some embodiments, the air cooler 130 includes a second conduit and/or passage between a second inlet and a second outlet thereof that is configured to receive and direct a second fluid (e.g., a cooling working fluid) that absorbs and/or transports the heat extracted from the compressed air away from the air cooler 130 (e.g., to the ambient environment, to a heat sink, to a supplemental heat exchanger, to a reservoir, etc.). By way of example, the air cooler 130 may be configured to cool the compressed air flowing therethrough such that the density of the compressed air increases before exiting the air cooler 130. The compressed, cooled air may thereafter be provided from the air cooler 130 to the engine 104. It is important to note that the air supply system 106 and the components thereof, in cooperation with the supplemental fuel system 200, may supply any gas or mixture of gases (e.g., atmospheric air, gaseous fuel, gaseous additives, etc.) to the engine 104, as described in more detail herein.

As shown in FIG. 1, the engine 104 includes a primary fuel injection system, shown as fuel injection system 140, coupled to the primary fuel system 102; a first manifold, shown as intake manifold 142, coupled to the air cooler 130; and a second manifold, shown as exhaust manifold 144, coupled to the exhaust system 108. The fuel injection system 140 may include at least one fuel injector per cylinder of the engine 104. The fuel injector may include an injection pump, an injector nozzle, and/or a fuel system sensor (e.g., a pressure sensor, a temperature sensor, a flow sensor, a fuel sensor, etc.). The injection pump may be configured to generate an injection pressure (e.g., a pressure sufficient to at least partially atomize the primary fuel when the primary fuel is forced through the injector nozzle and sprayed into the combustion chamber of the cylinder). The injection pump may be the same as or different than the fuel pump of the primary fuel system 102. The injector nozzle may be positioned downstream of the injector pump and may be at least partially disposed within the combustion chamber and/or may be proximate the combustion chamber. For example, the injector nozzle may be positioned and configured to selectively supply a metered amount of the primary fuel directly to a combustion chamber (i.e., a direct fuel injection) and/or indirectly to the combustion chamber via a component upstream the combustion chamber (i.e., an indirect fuel injection).

The intake manifold 142 may be configured (e.g., via tubes, pipes, channels, cavities, flow paths, etc.) to evenly distribute air and/or supplemental fuel (e.g., the compressed/cooled air, a combination of the compressed/cooled air and supplemental fuel, etc.) received from the air cooler 130 of the air supply system 106 to the one or more cylinders of the engine 104. The one or more cylinders of the engine 104 may, therefore, receive (i) the primary fuel from the primary fuel system 102 through the fuel injection system 140, (ii) the compressed/cooled air from the air supply system 106 through the intake manifold 142, and (iii) the supplemental fuel from the supplemental fuel system 200 through the air supply system 106 and the intake manifold 142. The engine 104 may, therefore, perform a combustion-ignition process within each of the one or more cylinders thereof using the primary fuel, the compressed/cooled air, and/or the supplemental fuel to power the vehicle 10 and/or components thereof. The exhaust manifold 144 may be configured to collect exhaust gases produced as a byproduct of the combustion-ignition process from the one or more cylinders of the engine 104 and provide the exhaust gases to the exhaust system 108.

As shown in FIG. 1, the exhaust system 108 includes an exhaust assembly, shown as exhaust 150, and an exhaust opening, shown as exhaust outlet 152. The exhaust 150 may be configured to reduce emissions of pollutants (e.g., products of combustion such as carbon dioxide, carbon monoxide, sulfur dioxide, nitrogen oxides, lead, particulate matter, etc.), attenuate noise, and/or direct the exhaust gases from the engine 104 through the turbine 128 of the turbocharger 124 and to the exhaust outlet 152. For example, the exhaust 150 may include a catalytic converter, a selective catalytic reduction ("SCR") system, an exhaust gas recirculation ("EGR") system, a particulate filter (e.g., a diesel particulate filter ("DPF"), etc.), a muffler (e.g., silencer, damper, suppressor, baffle system, etc.), and/or one or more conduits (e.g., piping, downpipe, headers, mid-pipe, exhaust pipe, tailpipe, etc.). According to an exemplary embodiment, the exhaust gases flowing through the exhaust system 108 pass through the turbine 128 of the turbocharger 124 such that the exhaust gases drive the turbine 128 to rotate. Rotation of the turbine 128, thereby, drives rotational motion of the compressor 126. The rotation of the compressor 126 may compress the air entering the air supply system 106, which may increase the performance of the engine 104 and improve fuel efficiency. The components of the exhaust 150 may be fluidly connected in series and/or in parallel between the engine 104 and the exhaust outlet 152.

As shown in FIG. 1, the engine 104 is configured to drive the alternator 110. The alternator 110 may be configured to convert at least a portion of the mechanical output from the engine 104 into electrical energy. As shown in FIG. 1, the alternator 110 is electrically coupled to the power supply 112 and may be configured to supply the electrical energy generated thereby to the power supply 112 to charge the power supply 112. The power supply 112 may be electrically coupled (e.g., wired) to the alternator 110. The power supply 112 may be or may include an electrical energy storage device (e.g., a capacitor, a battery, a lead-acid battery, a battery cell, a battery cell array, etc.) and/or an electrical regulator (e.g., a voltage regulator, a fuse, a diode, a rectifier, an inverter, etc.). In some embodiments, the driveline 100 includes two or more alternators 110 and/or two or more power supplies 112.

In some embodiments, the power supply 112 is configured to supply electricity (e.g., electric power) to some or all of the electrical components of the vehicle 10. For example, the power supply 112 may provide electrical energy to the engine 104 (e.g., an electric starter, an engine control unit ("ECU"), position sensors, rotation sensors, temperature sensors, pressure sensors, an electrically driven lubricating oil pump, an electronic fuel injector system, etc.), the primary fuel system 102 (e.g., an electronic fuel pump, etc.), the exhaust system 108 (e.g., electronic exhaust valves, exhaust sensors, etc.), the supplemental fuel system 200 (e.g., electronic valves, etc.), the supplemental fuel control system 350 (e.g., sensors, a controller, a user interface, etc.), and/or other electronic vehicle accessories and/or subsystems (e.g., electronic power steering, a vehicle lighting system, a vehicle sensor system, a vehicle infotainment system, a vehicle user interface, a sound system, an HVAC system, etc.).

In some embodiments, the engine 104 includes an ECU (e.g., an engine controller, a microprocessor, a processing circuit, etc.) configured to control at least one engine operation or parameter of the engine 104. According to an exemplary embodiment, the ECU is separate from the supplemental fuel control system 350 (e.g., when the supplemental fuel control system 350 is provided in a retrofit or conversion kit). In some embodiments, the vehicle 10 includes a supervisory controller that controls the ECU and the supplemental fuel control system 350. In some embodiments, the ECU and the supplemental fuel control system 350 are one in the same (e.g., when the supplemental fuel system 200 and the supplemental fuel control system 350 are installed by an OEM during the production of the vehicle 10).

Supplemental Fuel System

Figure 2:
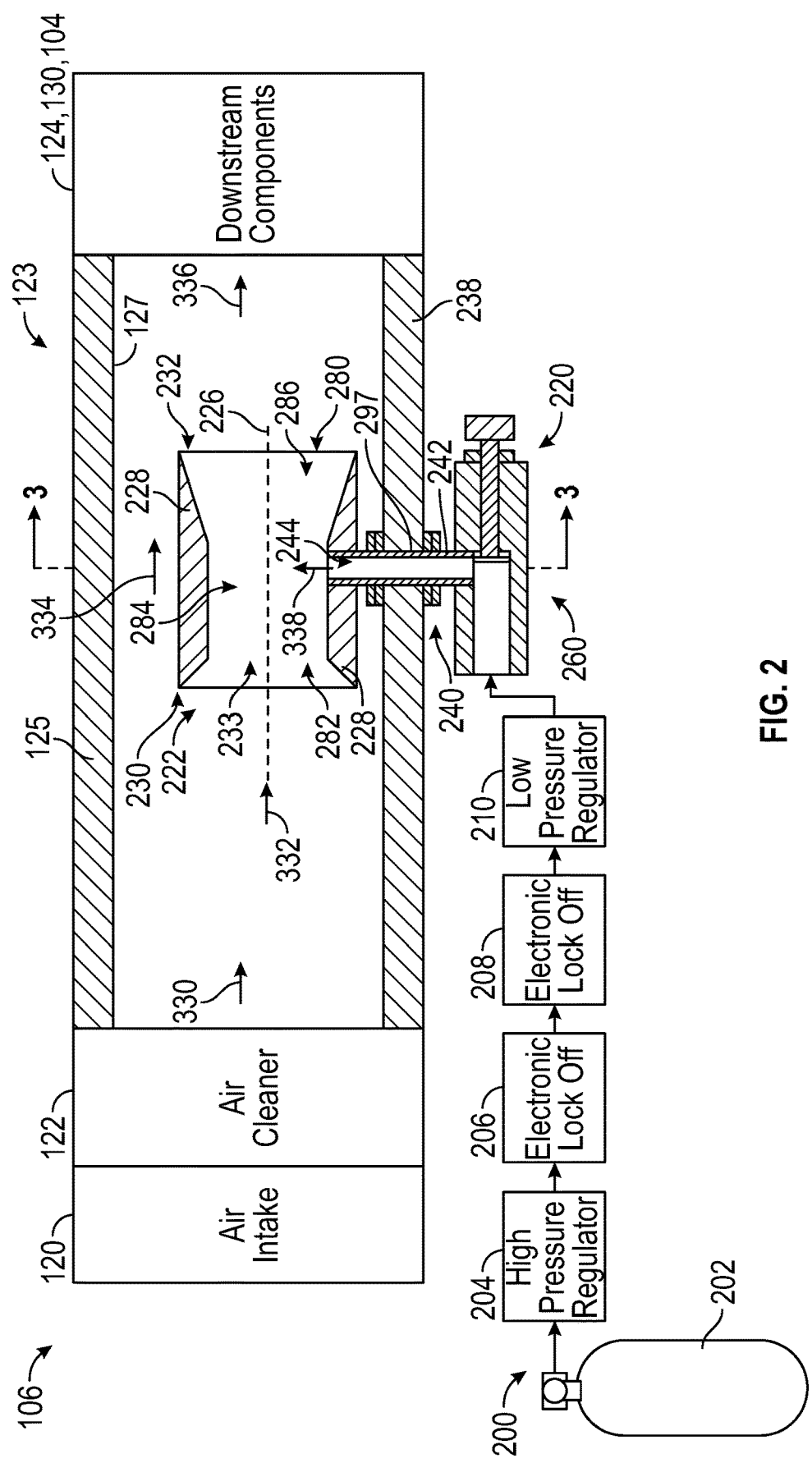
FIG. 2 is a schematic view of a portion of the air supply system and the second fuel system of FIG. 1, according to an exemplary embodiment.

As shown in FIGS. 1 and 2, the supplemental fuel system 200 includes a fuel storage device, shown as pressurized fuel tank 202, a first pressure regulator, shown as high pressure regulator 204, a first control valve, shown as first electronic lock off 206, a second control valve, shown as second electronic lock off 208, a second pressure regulator, shown as low pressure regulator 210, and a mixing device (e.g., an injector, a mixer, a nozzle device, a Venturi device, etc.), shown as fuel mixer 220. In some embodiments, the supplemental fuel system 200 does not include one of the high pressure regulator 204 or the low pressure regulator 210. In some embodiments, the supplemental fuel system 200 does not include one of the first electronic lock off 206 or the second electronic lock off 208.

The pressurized fuel tank 202 may be configured to store, contain, or hold the second or supplemental fuel that is different than the primary fuel of the primary fuel system 102. For example, the pressurized fuel tank 202 may be a canister for storing a compressed, gaseous fuel or a liquefied fuel. In some embodiments, the supplemental fuel is a compressed, gaseous fuel. In one embodiment, the compressed, gaseous fuel is compressed natural gas ("CNG"). In other embodiments, the compressed, gaseous fuel is another type of compressed, gaseous fuel (e.g., methane, hydrogen, etc.) or any mixture or combination thereof In some embodiments, the supplemental fuel is a liquefied fuel (e.g., liquefied natural gas, liquid propane, etc.).

As shown in FIGS. 1 and 2, the outlet of the pressurized fuel tank 202 is fluidly coupled to the high pressure regulator 204. The high pressure regulator 204 may be configured as a pressure reducing regulator. For example, the high pressure regulator 204 may be configured to reduce the pressure of the supplemental fuel received from the pressurized fuel tank 202 to a first controlled pressure or a first target pressure at the outlet of the high pressure regulator 204. In other words, the high pressure regulator 204 may be configured to output the supplemental fuel at a desired pressure when supplied with the supplemental fuel at a pressure above the first target pressure. In some embodiments, the pressurized fuel tank 202 stores and supplies the supplemental fuel at a storage or high pressure (e.g., between 200 and 4,000 psi; 3,600 psi; etc.). In such embodiments, the high pressure regulator 204 may be configured to reduce the pressure of the supplement fuel from the high pressure to the first target pressure. In some embodiments, the first target pressure is a predetermined value (e.g., about 200 psi, about 150 psi, etc.). The first target pressure may be or include a threshold value (e.g., less than 200 psi, less than 150 psi, etc.), or a range of threshold values (e.g., between 100 psi and 200 psi). For example, the high pressure regulator 204 may be configured to reduce the pressure of the gaseous fuel to between 100 psi to 200 psi based on an input pressure between 200 psi and 4,000 psi. In some embodiments, the high pressure regulator 204 is configured to facilitate vaporization of the supplemental fuel as the pressure thereof is decreased (e.g., if received from pressurized fuel tank 202 in a liquid form, etc.).

As shown in FIGS. 1 and 2, the high pressure regulator 204 is positioned upstream of the first electronic lock off 206 and the first electronic lock off 206 is positioned upstream of the second electronic lock off 208 and the low pressure regulator 210. In other embodiments, the first electronic lock off 206 is positioned upstream of the high pressure regulator 204. In some embodiments, the supplemental fuel system 200 does not include the first electronic lock off 206. As shown in FIGS. 1 and 2, the second electronic lock off 208 is positioned downstream of the first electronic lock off 206 and upstream of the low pressure regulator 210. In other embodiments, the second electronic lock off 208 is positioned downstream of the low pressure regulator 210. In some embodiments, the supplemental fuel system 200 does not include the second electronic lock off 208.

The first electronic lock off 206 and/or the second electronic lock off 208 may include an actuator and a valve configured to facilitate selectively controlling or inhibiting the flow of the supplemental fuel through the first electronic lock off 206. In one embodiment, the first electronic lock off 206 and/or the second electronic lock off 208 are or include a normally-closed valve configured to be biased closed and open such that the supplemental fuel flows through the first electronic lock off 206 and/or the second electronic lock off 208 in response a current or electronic signal being supplied thereto (e.g., by the supplemental fuel control system 350). In another embodiment, the first electronic lock off 206 and/or the second electronic lock off 208 are or include a normally-open valve configured to be biased open and close such that the supplemental fuel does not flow through the first electronic lock off 206 and/or the second electronic lock off 208 in response a current or electronic signal being supplied thereto (e.g., by the supplemental fuel control system 350). In still another embodiment, the first electronic lock off 206 and/or the second electronic lock off 208 are or include an unbiased valve. As used herein, an unbiased valve refers to any valve that is not biased by a spring or otherwise toward a closed position or an open position. Unbiased valves can include one or more actuators (e.g., electric solenoids) that act on a valve element to move the valve element between the open position and the closed position. In some embodiments, the first electronic lock off 206 and/or the second electronic lock off 208 include a check valve such that the supplemental fuel flows in a single direction therethrough.

As shown in FIGS. 1 and 2, the low pressure regulator 210 is positioned to receive the supplemental fuel in a gaseous state at the first target pressure (e.g., from the high pressure regulator 204, from the first electronic lock off 206, from the second electronic lock off 208, etc.). The low pressure regulator 210 may be configured as a pressure reducing regulator. For example, the low pressure regulator 210 may be configured to reduce the pressure of the supplemental fuel that enters the inlet of the low pressure regulator 210 to a second controlled pressure or a second target pressure at the outlet of the low pressure regulator 210. In other words, the low pressure regulator 210 may be configured to output the supplemental fuel at a desired pressure when supplied the supplemental fuel at a pressure above the second target pressure. According to an exemplary embodiment, the high pressure regulator 204 is configured to supply the supplemental fuel to the inlet of the low pressure regulator 210 at the first target pressure. The low pressure regulator 210 may be configured to further reduce the pressure of the supplemental fuel from the first target pressure to the second target pressure. In one embodiment, the second target pressure is a low or near zero pressure (e.g., about 3 inches water, about 0.1 psi, less than 3 inches water, less than 0.2 psi, etc.). In this way, the supplemental fuel may be stored at high pressure (e.g., 3600 psi) and pass through one or more pressure regulators (e.g., the high pressure regulator 204 and/or the low pressure regulator 210) to achieve the low or near zero pressure. In some embodiments, the low pressure regulator 210 is normally closed unless a vacuum signal is present at the outlet of the low pressure regulator 210. In such embodiments, the low pressure regulator 210 is configured to supply the supplemental fuel in response to the vacuum. The amount of fuel supplied by the low pressure regulator 210 may be based on the amount of vacuum present at the outlet thereof (e.g., the greater the vacuum, the more open the low pressure regulator 210 may become, etc.). In some embodiments, the low pressure regulator 210 includes a vacuum switch. In some embodiments, the low pressure regulator 210 is a PEV-01-08 regulator. In some embodiments, the low pressure regulator 210 is a two-stage regulator.

As shown in FIGS. 1 and 2, the outlet of the low pressure regulator 210 is coupled to an inlet the fuel mixer 220. Generally, the fuel mixer 220 may positioned such that (i) a first inlet of the fuel mixer 220 is downstream of the air intake 120 (e.g., within the air cleaner 122, downstream of the air cleaner 122, upstream of the compressor 126 of the turbocharger 124, etc.), (ii) a second inlet of the fuel mixer 220 is downstream of the pressurized fuel tank 202 and/or at least one regulator (e.g., the high pressure regulator 204, the low pressure regulator 210, etc.), and (iii) an outlet of the fuel mixer 220 is positioned upstream of the engine 104 (e.g., upstream of the compressor 126 of the turbocharger 124). According to an exemplary embodiment, the fuel mixer 220 is configured to mix two or more fluids. In the current implementation, the fuel mixer 220 is configured to (i) mix (a) the air flowing into and through the air supply system 106 and (b) the supplemental gaseous fuel provided by the low pressure regulator 210 and (ii) output the mixture to the downstream components of the air supply system 106 (e.g., the turbocharger 124, the air cooler 130, etc.) and/or the engine 104. According to the exemplary embodiment shown in FIG. 1, the fuel mixer 220 is positioned to output the mixture to the inlet of the compressor 126 of the turbocharger 124. In some embodiments, the fuel mixer 220 is coupled to or formed in other components of the air supply system 106. For example, the fuel mixer 220 can be installed inside the air cleaner 122 or a conduit that is fluidly coupled to one or more of the components of the air supply system 106.

Fuel Mixer Construction

As shown in FIGS. 2-8, the fuel mixer 220 includes a first portion or a fuel mixer portion, shown as nozzle 222; a second portion or fuel supply portion, shown as stem assembly 240, coupled to the nozzle 222; and a third portion or a control valve portion, shown as fuel flow valve 260, coupled to the stem assembly 240. In some embodiments, the components of the fuel mixer 220 are manufactured from at least one rigid material. For example, the nozzle 222, the stem assembly 240, the fuel flow valve 260, and/or the components thereof may be manufactured from a variety of materials including metals (e.g., steel, stainless steel, aluminum, titanium, etc.), metal alloys (e.g., brass, aluminum alloys, etc.), plastics (e.g., thermoset, thermoplastic, resin, etc.), composite materials (e.g., carbon fiber reinforced plastic, etc.), organic materials, inorganic materials, and/or other suitable materials.

Figure 8:
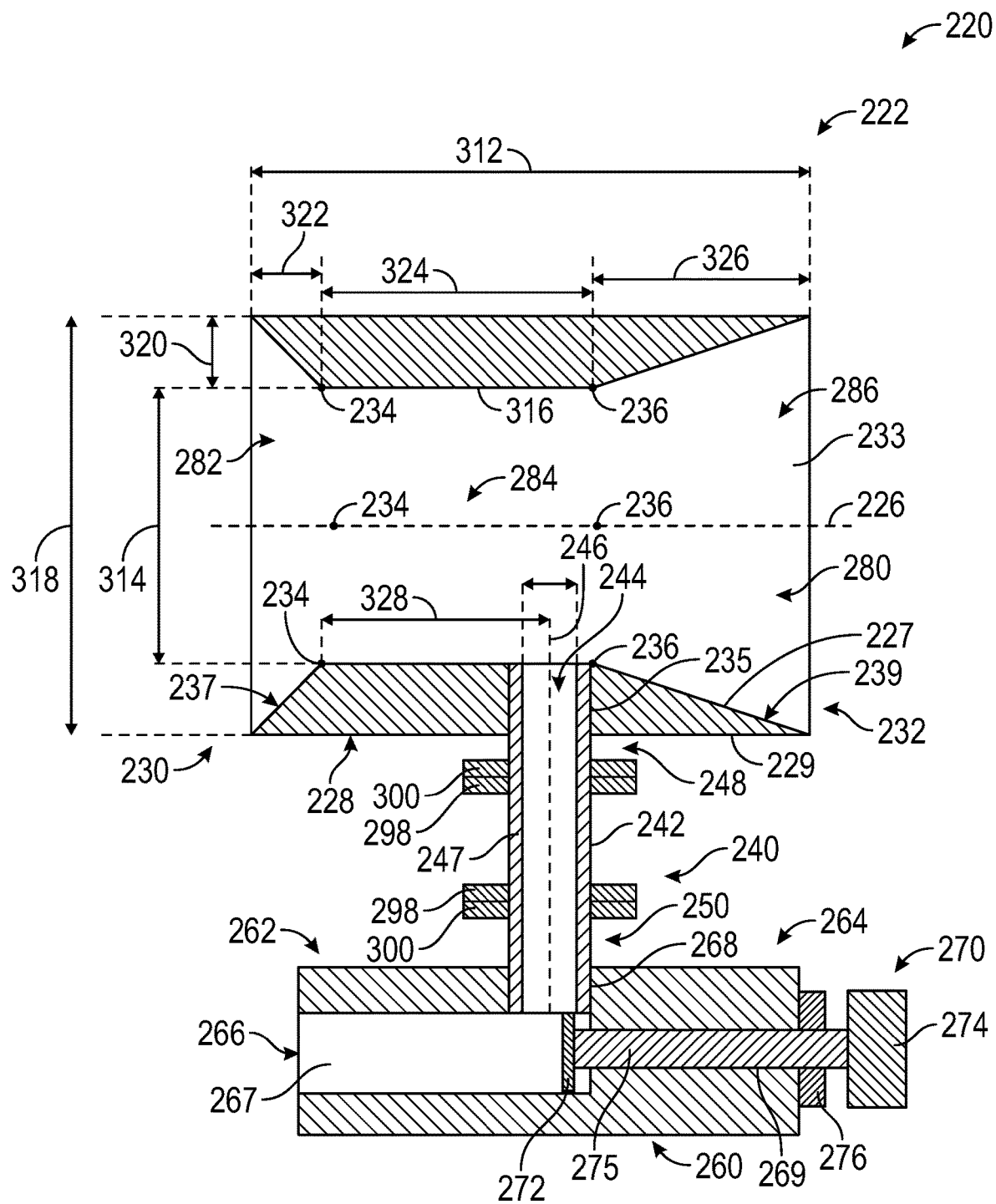
FIG. 8 is a cross sectional view of the portion of the second fuel system of FIG. 4, according to an exemplary embodiment.

As shown in FIGS. 2 and 8, the nozzle 222 defines a first axis, shown as longitudinal axis 226. As shown in FIGS. 2-8, the nozzle 222 includes a peripheral sidewall or housing, shown as nozzle body 228, having a first surface, shown as inner surface 227, a second surface, shown as outer surface, a first end, shown as inlet end 230, and an opposing second end, shown as outlet end 232. As shown in FIGS. 2, 3, and 5-8, the nozzle 222 defines a passage, shown as nozzle passage 233, extending along the longitudinal axis 226 from the inlet end 230 to the outlet end 232 of the nozzle body 228. As shown in FIGS. 3 and 5-8, the nozzle body 228 defines a first inlet, shown as supplemental fuel inlet 235, that leads to the nozzle passage 233. In some embodiments, the supplemental fuel inlet 235 includes a plurality of inlets positioned radially around nozzle body 228 (e.g., in one or more rings defined by the inner surface 227, longitudinally spaced along the nozzle body 228, etc.). In such embodiments, the nozzle body 228 may define an internal passage that fluidly connects the plurality of inlets.

According to the exemplary embodiment shown in FIGS. 2 and 8, the outer surface 229 of the nozzle body 228 has a substantially uniform and symmetric profile (e.g., a cylindrical profile, etc.) and the inner surface 227 of the nozzle body 228 has a non-uniform or asymmetric profile (i.e., asymmetry between a first or inlet taper positioned at the inlet end 230 and a second or outlet taper positioned at the outlet end 232). As shown in FIG. 8, the nozzle body 228 has a first transition point, shown as inlet transition point 234, and a second transition point, shown as outlet transition point 236. The inner surface 227 defines (i) a first taper, shown as inlet taper 237, that extends from the inlet end 230 to the inlet transition point 234 at a first angle and (ii) a second taper, shown as outlet taper 239, that extends from the outlet end 232 to the outlet transition point 236 at a second angle different than the first angle of the inlet taper 237. According to an exemplary embodiment, the first angle is greater than the second angle (i.e., the inlet taper 237 is substantially more abrupt than the outlet taper 239 and the outlet taper 239 is substantially more gradual than the inlet taper 237). According to an exemplary embodiment, a ratio of an outlet longitudinal length of the outlet taper 239 to an inlet longitudinal length of the inlet taper 237 is greater than one (e.g., 2, 3, 4, etc.).

As shown in FIGS. 2 and 5-8, the inlet end 230, the outlet end 232, and the inner surface 227 define and shape the nozzle passage 233 such that the nozzle passage 233 has a non-uniform profile, show as flow profile 280. The flow profile 280 includes (i) a first portion that defines a second inlet of the nozzle 222, shown as air inlet 282, defined by the inlet end 230 and the inlet taper 237, (ii) a second portion (e.g., narrow portion, a constriction portion, choke portion, throat portion, an intermediate portion, etc.), shown as mixing chamber 284, extending between the inlet transition point 234 and the outlet transition point 236, and (iii) a third portion the defines an outlet of the nozzle 222, shown as mixture outlet 286, defined by the outlet end 232 and the outlet taper 239.

According to an exemplary embodiment, the inner surface 227 of the nozzle body 228 is shaped such that the cross-sectional dimension of the flow profile 280 varies along the longitudinal axis 226 with (i) the cross-sectional dimension decreasing along the first portion of the flow profile 280 with inlet taper 237 from the inlet end 230 to the inlet transition point 234 and (ii) the cross-sectional dimension increasing along the third portion of the flow profile 280 with the outlet taper 239 from the outlet transition point 236 to the outlet end 232. According to an exemplary embodiment, the flow profile 280 is configured to provide a Venturi effect or functionality that facilitates generating a vacuum signal, as described in greater detail herein.

As shown in FIG. 8, the nozzle 222 has a first dimension, shown as nozzle length 312, a second dimension, shown as mixing chamber diameter 314, a third dimension, shown as nozzle outer diameter 318, a fourth dimension, shown as nozzle wall thickness 320, a fifth dimension, shown as nozzle inlet length 322, a sixth dimension, shown as mixing chamber length 324, a seventh dimension, shown as nozzle outlet length 326, and an eighth dimension, shown as fuel inlet position 328. The nozzle length 312 is the entire longitudinal length of the nozzle body 228 between the inlet end 230 and the outlet end 232, and is parallel to the longitudinal axis 226. The mixing chamber diameter 314 is the smallest radial distance between opposing portions of the inner surface 227 along the mixing chamber 284 and the longitudinal axis 226. In some embodiments, the mixing chamber diameter 314 is substantially uniform. In other embodiments, the mixing chamber diameter 314 slightly tapers between the inlet transition point 234 and the outlet transition point 236. The nozzle outer diameter 318 is the diameter of the outer surface 229 of the nozzle 222 and is larger than the mixing chamber diameter 314. In some embodiments, the nozzle outer diameter 318 is substantially uniform. In other embodiments, the nozzle outer diameter 318 is non-uniform (e.g., slightly tapers between the inlet end 230 and the outlet end 232, the outer surface 229 does not have a cylindrical profile, etc.). The nozzle wall thickness 320 is defined between the outer surface 229 and inner surface 227 of the nozzle body 228 of the nozzle 222, which varies along the longitudinal axis 226 between the inlet end 230 and the outlet end 232 of the nozzle 222. The nozzle inlet length 322 is the distance along the longitudinal axis 226 between the inlet end 230 and the inlet transition point 234 where the mixing chamber 284 begins (i.e., the longitudinal length of the inlet taper 237). The mixing chamber length 324 is the length of the mixing chamber 284 along the longitudinal axis 226 defined between the inlet transition point 234 and the outlet transition point 236. The nozzle outlet length 326 is the distance along the longitudinal axis 226 between the outlet transition point 236 where the mixing chamber 284 ends and the outlet end 232 (i.e., the longitudinal length of the outlet taper 239). The fuel inlet position 328 defines the position of the supplemental fuel inlet 235 along the mixing chamber 284. Specifically, the fuel inlet position 328 is defined as the distance between the inlet transition point 234 and a center point of the supplemental fuel inlet 235.

According to an exemplary embodiment, the nozzle length 312 is about 4 inches, the mixing chamber diameter 314 is about 2 inches, the nozzle outer diameter 318 is about 3 inches, the nozzle wall thickness 320 is at most about 0.5 inches, the nozzle inlet length 322 is about 0.5 inches, the mixing chamber length 324 is about 2 inches, and the nozzle outlet length 326 is about 1.5 inches. Stated differently, the mixing chamber diameter 314 is about 50% or one-half of the nozzle length 312 and 66.7% or two-thirds of the nozzle outer diameter 318, the nozzle outer diameter 318 is about 75% or three-fourths of the nozzle length 312, the nozzle wall thickness 320 is about 25% or one-fourth of the mixing chamber diameter 314 and about 16.7% or one-sixth of the nozzle outer diameter 318, the nozzle inlet length 322 is about 12.5% or one-eighth of the nozzle length 312, the mixing chamber length 324 is about 50% or one-half of the nozzle length 312 and about the same as the mixing chamber diameter 314, and the nozzle outlet length 326 is about 37.5% or three-eighths of the nozzle length 312. Accordingly, the nozzle outlet length 326 is about three times longer than the nozzle inlet length 322, the nozzle inlet length 322 is about one-fourth of the mixing chamber length 324, and the nozzle outlet length 326 is about three-quarters of the of the mixing chamber length 324. Applicant has identified, through various research, development, testing, and design iterations, that the dimensions and proportions of the nozzle 222 outlined above provide an enhanced Venturi functionality for the purposes of the application of the fuel mixer 220 disclosed herein.

In some embodiments, the proportions of the nozzle 222 are maintained, but the dimensions are varied (e.g., for a larger or smaller system). In such embodiments, the proportions of the nozzle 222 may be maintained, but the dimensions may be increased or decreased. By way of example, the nozzle 222 may have the same proportions as outlined above, but the dimensions may be half the scale. By way of another example, the nozzle 222 may have the same proportions as outlined above, but the dimension may be double, three times, etc. the scale.

In some embodiments, the proportions of the nozzle 222 and the dimensions of the nozzle are varied (e.g., for different applications of the fuel mixer 220, to vary the Venturi functionality of the fuel mixer 220, etc.). By way of example, the nozzle length 312 may range between 2 inches and 12 inches (e.g., 2 inches, 3 inches, 4.5 inches, 6 inches, 8 inches, 10 inches, etc.) or other suitable lengths. By way of another example, the mixing chamber diameter is 314 may range between 1 inch and 6 inches (e.g., 1.5 inches, 2.5 inches, 3 inches, 4 inches, 5 inches, etc.), or other suitable diameters. By way of another example, the nozzle wall thickness 320 may range between 0.25 inches and 1 inch. By way of another example, the mixing chamber length 324 may range between a negligible length (e.g., a single point) and 6 inches (e.g., 0.5 inches, 1 inch, 2 inches, 3 inches, 6 inches, etc.), or other suitable lengths. By way of another example, the nozzle inlet length 322 may range between 0.25 inches and 2 inches (e.g., 0.25 inches, 0.75 inches, 1 inch, 1.25 inches, 1.5 inches, etc.), or other suitable lengths. By way of another example, the nozzle outlet length 326 may range be 0.5 inches and 6 inches (e.g., 0.5 inches, 1 inch, 2 inches, 3 inches, 5 inches, etc.), or other suitable lengths.

According to the exemplary embodiment shown in FIG. 8, the fuel inlet position 328 of the supplemental fuel inlet 235 is selected such that the fuel inlet is positioned closer to the outlet transition point 236 and the outlet taper 239 than the inlet transition point 234 and the inlet taper 237 (i.e., the fuel inlet position 328 is a majority of the mixing chamber length 324). In other embodiments, the fuel inlet position 328 of the supplemental fuel inlet 235 is selected such that the supplemental fuel inlet 235 is positioned closer to the inlet transition point 234 and the inlet taper 237 than the outlet transition point 236 and the outlet taper 239 (i.e., the fuel inlet position 328 is a minority of the mixing chamber length 324). In still other embodiments, the fuel inlet position 328 of the supplemental fuel inlet 235 is selected such that the supplemental fuel inlet 235 is positioned at the middle of the mixing chamber 284 (i.e., the fuel inlet position 328 is one-half of the mixing chamber length 324).

Figure 3:
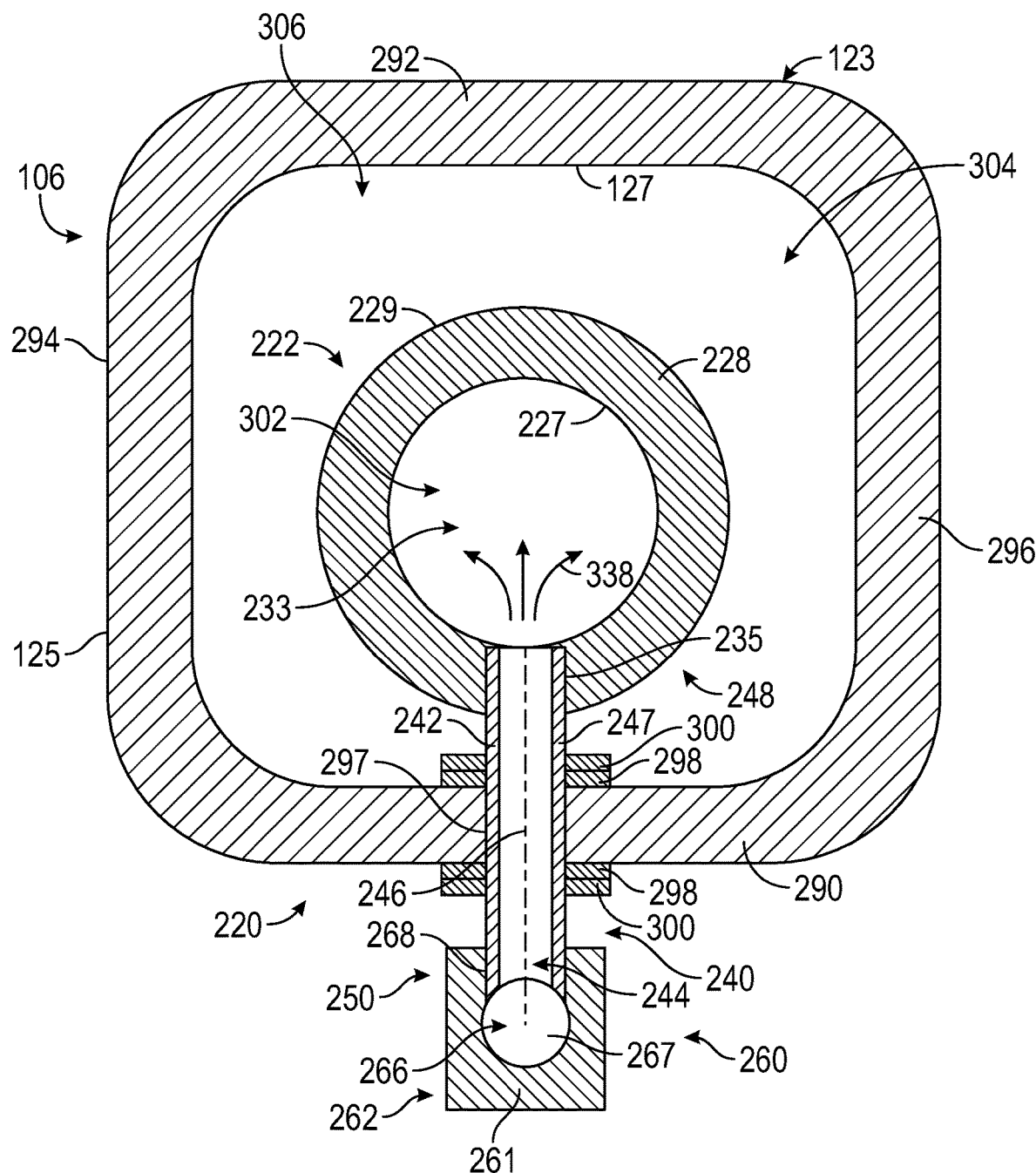
FIG. 3 is a cross section view of the portion of the air supply system and the second fuel system of FIG. 2, according to an exemplary embodiment.
Figure 4:
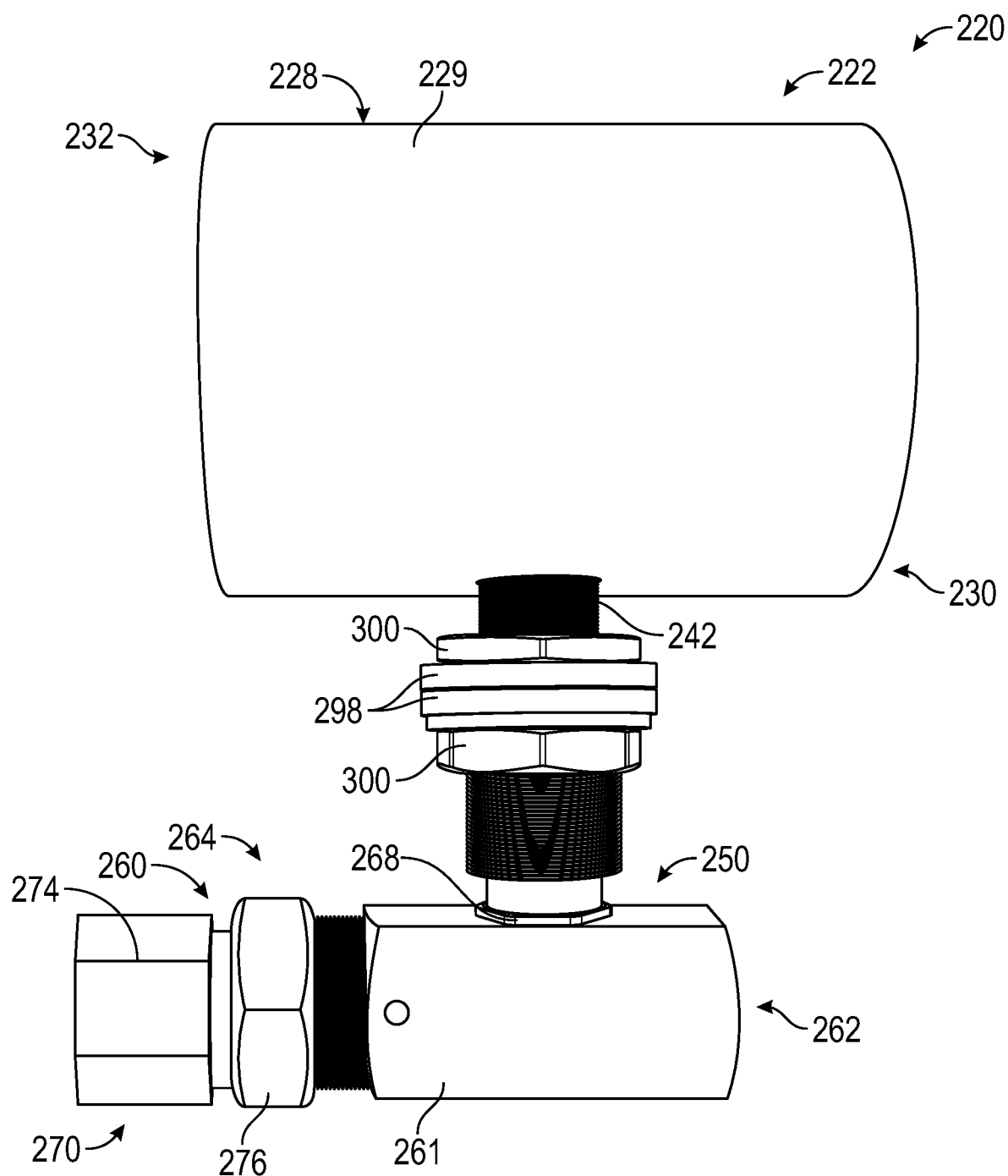
FIG. 4 is a side view of a portion of the second fuel system of FIG. 1, according to an exemplary embodiment.
Figure 7:
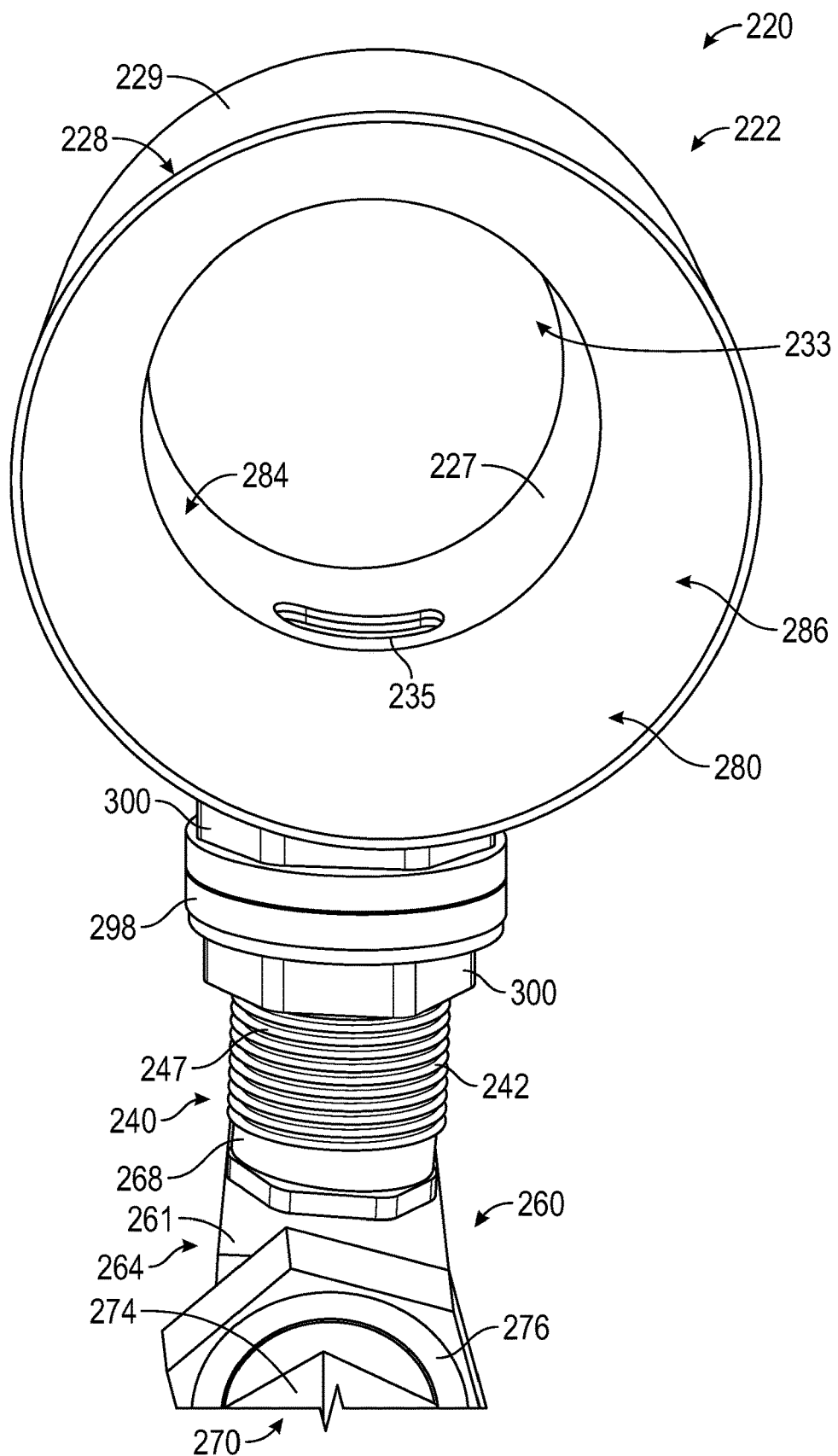
FIG. 7 is a rear perspective view of the portion of the second fuel system of FIG. 4, according to an exemplary embodiment.

As shown in FIGS. 2-8, the stem assembly 240 includes a hollow member or conduit, shown as stem 242. In one embodiment, the stem 242 has a unitary construction. In other embodiments, the stem 242 is manufactured from multiple sections that may be coupled together. For example, a first portion of the stem 242 may be welded, bonded, fastened, or otherwise attached to a second portion of the stem 242. As shown in FIGS. 2-8, the stem 242 includes a sidewall, shown as sidewall 247, that defines passage, shown as stem passage 244, that extends along a central axis, shown as axis 246, of the stem 242 between a first end, shown as nozzle end 248, and an opposing second end, shown as valve end 250, thereof. One or more portions of the sidewall 247 of the stem 242 may include male and/or female threading. As shown in FIGS. 3 and 8, (i) the nozzle end 248 of the stem 242 interfaces with and is received by the supplemental fuel inlet 235 of the nozzle 222 and (ii) the valve end 250 interfaces with and is received by a portion of the fuel flow valve 260 (e.g., an outlet thereof). In some embodiments, (i) the nozzle end 248 of the stem 242 and the supplemental fuel inlet 235 and (ii) the valve end 250 and the portion of the fuel flow valve 260 have corresponding threads that mesh to secure (a) the nozzle end 248 within the supplemental fuel inlet 235 and (b) the valve end 250 within the portion of the fuel flow valve 260.

As shown in FIGS. 3-5, 7, and 8, the stem assembly 240 includes (i) a pair of seals (e.g., o-rings, rubber washers, sealant, etc.), shown as seals 298, disposed along the stem 242 and (ii) a pair of fasteners (e.g., clamps, nuts, etc.), shown as fasteners 300, disposed along the stem 242 between the nozzle end 248 and the valve end 250 of the stem 242 and outside of the seals 298. According to an exemplary embodiment, the stem 242 and the fasteners 300 include corresponding threads that mesh such that rotation of the fasteners 300 relative to the stem 242 drives the fasteners 300 along the axis 246 of the stem 242 to facilitate selectively adjusting the distance between the seals 298.

As shown in FIGS. 3-8, the fuel flow valve 260 includes a body, shown as valve body 261, and an adjuster, shown as flow adjuster 270. According to an exemplary embodiment, the valve body 261 is configured to fluidly couple the fuel mixer 220 to the rest of the supplemental fuel system 200 (e.g., via a conduit, etc.). As shown in FIGS. 3-8, the valve body 261 has a first end, shown as valve inlet end 262, and an opposing second end, shown as adjuster end 264. The valve body 261 defines (i) an interior chamber, shown as valve chamber 267, (ii) a first aperture, shown as inlet 266, providing access to the valve chamber 267, (iii) an interface including a second aperture, shown as outlet 268, coupled to the valve chamber 267 and positioned between the valve inlet end 262 and the adjuster end 264, and (iv) a passage, shown as adjuster passage 269, that extends from the valve chamber 267 through the adjuster end 264 of the valve body 261. According to an exemplary embodiment, the inlet 266 of the valve body 261 is configured to couple with the low pressure regulator 210 (e.g., via a conduit). As shown in FIGS. 3-8, the outlet 268 of the valve body 261 interfaces with and receives the valve end 250 of the stem 242 to couple the valve body 261 to the nozzle 222.

According to an exemplary embodiment, the flow adjuster 270 is configured to facilitate selectively adjusting an amount of restriction applied to a fuel flow of the supplemental fuel through the valve body 261 and provided to the nozzle 222 and the air supply system 106, and ultimately the engine 104. By way of example, a portion of the flow adjuster 270 may be repositionable between a first position where the outlet 268 of the valve body 261 is not restricted, a second position where the outlet 268 of the valve body 261 is fully restricted, and a plurality of intermediate positions where the outlet 268 of the valve body 261 is at least partially restricted. According to the exemplary embodiment shown in FIGS. 4, 7, and 8, the flow adjuster 270 is manually and mechanically adjustable. In other embodiments, the flow adjuster 270 is electronically adjustable (e.g., via the supplemental fuel control system 350, in response to a user command, automatically, etc.).

As shown in FIGS. 4, 5, 7, and 8, the flow adjuster 270 includes (i) a restrictor, shown as plunger 272, disposed and selectively translatable within the valve chamber 267 of the valve body 261, (ii) an actuator, shown as adjuster knob 274, positioned along an exterior of the valve body 261, (iii) a shaft, shown as connector shaft 275, extending from the adjuster knob 274, through the adjuster passage 269 of valve body 261, and to the plunger 272 disposed within the valve chamber 267, and (iv) a retaining member (e.g., a set screw, a lock nut, etc.), shown as retainer 276.

According to an exemplary embodiment, manipulating (e.g., turning, pressing in, pulling out, etc.) the adjuster knob 274 facilitates adjusting the size of the valve chamber 267 and an amount of the outlet 268 that is restricted by the plunger 272. By way of example, the adjuster knob 274 may be manipulated to selectively position the plunger 272 to a fully open position, in which the plunger 272 does not restrict a fuel flow of the supplemental fuel through the valve chamber 267 and the outlet 268. By way of another example, the adjuster knob 274 may be manipulated to selectively position the plunger 272 to a partially closed position, in which the plunger 272 at least partially restricts a fuel flow of the supplemental fuel through the valve chamber 267 and the outlet 268. By way of yet another example, the adjuster knob 274 may be manipulated to selectively position the plunger 272 to a closed position, in which the plunger 272 fully restricts a fuel flow of the supplemental fuel through the valve chamber 267 and the outlet 268.

In some embodiments, the fully open position and fully closed position are defined by the maximum movable range of the plunger 272. The position of the plunger 272 may be is adjusted (e.g., by manipulating the adjuster knob 274) to accommodate various different fuel flow requirements for various engines and/or desired performance parameters. For example, a first engine type may require less supplemental fuel due to a high/overactive vacuum signal caused by a high flow rate of air through the air supply system 106. Therefore, the adjuster knob 274 may be adjusted to move the plunger 272 toward the closed position, thereby facilitating tuning the fuel mixer 220 for the specific engine. Once a desirable position for the plunger 272 has been set, the adjuster knob 274 may be locked or fixed in place by the retainer 276 to prevent inadvertent movement of the plunger 272 during use of the supplemental fuel system 200.

Fuel Mixer Positioning

As shown in FIGS. 1-3, the fuel mixer 220 is integrated into the air supply system 106. According to the exemplary embodiment shown in FIGS. 1-3, the fuel mixer 220 is integrated within a conduit 123 of the air supply system 106, downstream of the air intake 120 and the air cleaner 122, and upstream of the compressor 126 of the turbocharger 124, the air cooler 130, and the engine 104. In one embodiment, the fuel mixer 220 is installed inside of or integrated into the air cleaner 122 (e.g., the tubing of the air cleaner 122). By way of example, in such an implementation, a first end of the conduit 123 may terminate at the air cleaner 122 and an opposing second end of the conduit 123 may terminate at the compressor 126 of the turbocharger 124. In other embodiments, the fuel mixer 220 is otherwise positioned. By way of another example, the fuel mixer 220 may be integrated into the conduit 123 of the air supply system 106 downstream of the compressor 126 of the turbocharger 124 or downstream of the air cooler 130.

As shown in FIGS. 2 and 3, the conduit 123 has a peripheral wall, shown as sidewall 125, including a plurality of wall portions, shown as first wall section 290, second wall section 292, third wall section 294, and fourth wall section 296. As shown in FIG. 3, the first wall section 290 defines an aperture, shown as fuel mixer aperture 297. In other embodiments, one of the second wall section 292, the third wall section 294, or the fourth wall section 296 defines the fuel mixer aperture 297. As shown in FIGS. 2 and 3, (i) the fuel mixer aperture 297 receives the stem 242 of the fuel mixer 220 such that the nozzle end 248 of the stem 242 is positioned within the conduit 123 and the valve end 250 of the stem 242 is positioned outside of the conduit 123 and (ii) the nozzle 222 is coupled to the nozzle end 248 of the stem 242 and positioned within the conduit 123.

As shown in FIG. 3, the seals 298 are positioned at opposing sides of the sidewall 125 and the fuel mixer aperture 297. The fasteners 300 are positioned to (i) compress the seals 298 against the interface of the stem 242 and the fuel mixer aperture 297 to generate an air-tight seal between the stem 242 and the conduit 123 and (ii) couple or secure the stem 242 and, thereby, the fuel mixer 220 to the sidewall 125 of the conduit 123. In other embodiments, the fuel mixer 220 does not include the seals 298 and/or the fasteners 300. By way of example, the stem 242 may be adhesively secured within the fuel mixer aperture 297. By way of another example, the stem 242 may be welded to the sidewall 125 of the conduit 123. By way of yet another example, the conduit 123 and the stem 242 may be an integral component having a unitary structure that is inserted into the air supply system 106.

According to an exemplary embodiment, the nozzle 222 is sized and shaped to have a streamlined physical profile such that a substantial majority of the air flowing through the conduit 123 is substantially unobstructed by the physical presence of the fuel mixer 220 (e.g., the stem 242, the nozzle body 228 of the nozzle 222, etc.) within the conduit 123. As a result, the volume and flow rate of the air available to the engine 104 through the air supply system 106 may, therefore, be substantially unrestricted by the inclusion of the fuel mixer 220 within the air supply system 106.

As shown in FIG. 3, the nozzle 222 defines a first area, shown as nozzle flow area 302, and the conduit 123 defines a second area, shown as conduit area 304. According to the exemplary embodiment shown in FIG. 3, the nozzle flow area 302 is smaller than the conduit area 304. Therefore, all of the air flowing into and through the air supply system 106 and the conduit 123 does not flow through nozzle passage 233 of the nozzle 222, but only a portion of the air flowing into and through the air supply system 106 flows through the nozzle passage 233 of the nozzle 222. More specifically, as shown in FIG. 2, a first portion 332 of filtered, inlet air 330 drawn into the air supply system 106 flows into the nozzle passage 233 of the nozzle 222 and a second portion 334 of the inlet air 330 drawn into the air supply system 106 flows around and bypasses the nozzle passage 233 between an interior surface 127 of the sidewall 125 of the conduit 123 and the outer surface 229 of the nozzle body 228 of the nozzle 222. Accordingly, as shown in FIG. 3, a third area, shown as bypass flow area 306, is defined between the interior surface 127 of the sidewall 125 of the conduit 123 and the outer surface 229 of the nozzle body 228 of the nozzle 222 through which the second portion 334 of the inlet air 330 flows. The conduit area 304 is, therefore, the combination of the nozzle flow area 302 and the bypass flow area 306.

In an alternative embodiment, all of the inlet air 330 that is drawn into the air supply system 106 flows through the nozzle 222. By way of example, the nozzle 222 may be integrated as a section insert between two adjacent conduit portions and have a diameter substantially equal to the two conduit portions such that all of the inlet air 330 flowing into and through the air supply system 106 flows though the nozzle passage 233 of the nozzle 222.

Fuel Mixer Function

As shown in FIGS. 2 and 3, (i) the inlet air 330 flows through the air intake 120, through the air cleaner 122, and into the conduit 123 within which the nozzle 222 of the fuel mixer 220 is positioned, (ii) the first portion 332 of the inlet air 330 flows through the nozzle 222, (iii) the second portion 334 of the inlet air 330 flows around the nozzle 222, and (iv) the first portion 332 and the second portion 334 rejoin downstream of the nozzle 222 as downstream air 336. The downstream air 336 then flows through the remainder of the air supply system 106 (e.g., the compressor 126 of the turbocharger 124, the air cooler 130, etc.) and is provided to the intake manifold 142 of the engine 104. When the supplemental fuel system 200 is operational (e.g., the first electronic lock off 206 and the second electronic lock off 208 are open), a supplemental fuel supply, shown as supplemental fuel 338, may be provided, injected, drawn, etc. into the nozzle passage 233 to dose or mix with the first portion 332 of the inlet air 330 flowing through the nozzle 222. The downstream air 336 may, therefore, either be the inlet air 330 (e.g., when the supplemental fuel system 200 is not operational) or a mixture of inlet air 330 and the supplemental fuel 338 (e.g., when the supplemental fuel system 200 is operational).

According to an exemplary embodiment, when the supplemental fuel system 200 is operational, the flow profile 280 of the nozzle 222 is configured to provide a Venturi effect as the first portion 332 of the inlet air 330 flows through the nozzle passage 233 of the nozzle 222 that generates a vacuum signal at the nozzle end 248 of the stem 242 and, therefore, at the outlet of the low pressure regulator 210. The vacuum signal causes the supplemental fuel 338 to be drawn from the low pressure regulator 210, through the fuel flow valve 260, through the stem 242, and out of the supplemental fuel inlet 235 of the nozzle 222 into the nozzle passage 233 of the nozzle 222 where the supplemental fuel 338 mixes with the first portion 332 of the inlet air 330, and the mixture subsequently rejoins the second portion 334 of the inlet air 330 to provide the downstream air 336.

More specifically, the structure and shape of inlet taper 237 at the air inlet 282 of the flow profile 280 is configured to increase pressure of the first portion 332 of the inlet air 330 entering the inlet end 230 of the nozzle 222. As the first portion 332 of the inlet air 330 flows through the mixing chamber 284 and out of the mixture outlet 286 of the flow profile 280, the structure and shape of the mixing chamber 284 and the outlet taper 239 at the mixture outlet 286 of the flow profile 280 is configured to increase the velocity of the first portion 332 of the inlet air 330, thus reducing the pressure of the first portion 332 of the inlet air 330 flowing through the air inlet 282 of the flow profile 280. The reduced pressure of the first portion 332 of the inlet air 330 flowing through the mixing chamber 284 and out of the mixture outlet 286 generates a vacuum across the supplemental fuel inlet 235 and, therefore, the vacuum signal at the outlet of the low pressure regulator 210. According to an exemplary embodiment, the low pressure regulator 210 is configured to release the supplemental fuel 338 to the fuel flow valve 260 in response to and based on the vacuum signal.

According to an exemplary embodiment, a higher velocity or flow rate of the inlet air 330 and the downstream air 336 through the air supply system 106, and consequently through the nozzle 222, generates a greater vacuum signal in the supplemental fuel system 200 (i.e., at the low pressure regulator 210). By way of example, the vacuum signal may be proportional to the velocity or flow rate of the inlet air 330 and the downstream air 336. The velocity and flow rate of the inlet air 330 and the downstream air 336 increases as the speed (i.e., revolutions-per-minute ("rpms")) of the engine 104 increases because, as the speed of the engine 104 increases, more exhaust is output to the turbine 128 of the turbocharger 124, which ultimately drives the compressor 126 of the turbocharger 124 faster and, therefore, draws more and faster air into and through the air supply system 106. Therefore, as the vacuum signal fluctuates (i.e., increases or decreases), the amount of the supplemental fuel 338 released by the low pressure regulator 210 and provided to the fuel mixer 220 will similarly fluctuate. In this way, the quantity of the supplemental fuel 338 entering the air supply system 106 is mechanically regulated by the fuel mixer and the regular operation of the engine 104 and the turbocharger 124 (i.e., the airflow caused thereby within the air supply system 106) without the use of electronic monitoring or electronic supplemental fueling supply control.

Advantageously, the mechanically regulated supply of the supplemental fuel 338 provided by the supplemental fuel system 200 may facilitate an improvement in the driveline 100 that consumes less liquid fuel (e.g., diesel fuel) during the operation of the engine 104, may improve overall fuel efficiency of the engine 104, may reduce the generation of pollutants, and/or may facilitate a reduced engine fuel cost of the engine 104. The supplemental fuel system 200 may further facilitate an improved installation process and usability. For example, a user of the supplemental fuel system 200 may not need to interact with the ECU of the engine 104 or directly modify or monitor a control scheme of the primary fuel system 102 to install and/or utilize the supplemental fuel system 200. Additionally, because the flow of gaseous fuel into the air supply system 106 is regulated primarily in response to a low pressure signal generated by regular operation of the driveline 100, the quantity of gaseous fuel entering the air supply system 106 is reactive to the operational speed of the engine 104 without requiring a costly and/or complex electronic engine monitoring system. In other words, as more air is drawn into the air supply system 106 during higher engine speeds of the engine 104, a proportionate increase in the quantity of the supplemental fuel 338 may be mechanically drawn into the air supply system 106 from the low pressure regulator 210 based on an increased vacuum signal.

In some embodiments, when the engine 104 is off or idling (e.g., not consuming fuel, not cycling, at idle speeds, etc.), a negligible or reduced amount of air flows through the air supply system 106, leading to a negligible or insignificant vacuum signal being generated by the fuel mixer 220, which may at least partially cause one or more components of the supplemental fuel system 200 (e.g., the low pressure regulator 210, the first electronic lock off 206, etc.) to block or prevent a flow of the supplemental fuel 338 from being provided to the air supply system 106.

In some embodiments, the fuel flow valve 260 is adjusted (e.g., opened, closed, fully opened, fully closed, etc.) to accommodate various air supply systems 106 and/or engines 104 of a specific vehicle to which the supplemental fuel system 200 is being used with. In some embodiments, the fuel flow valve 260 is adjustable to achieve a threshold engine performance or threshold ratio of air to supplemental fuel (e.g., gaseous fuel) to primary fuel (e.g., liquid fuel). In some embodiments, the fuel flow valve 260 of the fuel mixer 220 is adjusted (e.g., at least partially closed) to alter the vacuum signal output from the fuel mixer 220.

In some embodiments, the engine 104 (e.g., via an ECU) may be configured to reduce the amount of primary fuel (e.g., diesel fuel) used thereby during an engine operation based on the amount of supplemental fuel 338 added to the air flow by the supplemental fuel system 200 and provided to the engine 104 (e.g., reducing primary fuel consumption).

While the fuel mixer 220 has been disclosed herein as including a Venturi nozzle that facilitates mechanically and passively dosing the inlet air 330 with the supplemental fuel 338 based on the vacuum signal, in other implementations, the fuel mixer 220 may be replaced with an actively controlled fuel mixer (e.g., controlled by the supplemental fuel control system 350). By way of example, the fuel mixer 220 may be replaced with a supplemental fuel injector that is electrically-controllable to inject a suitable amount of the supplemental fuel 338 into the conduit 123. By way of example, the supplemental fuel injector may be controlled based on sensor inputs including engine speed, throttle position, velocity and/or flow rate of the inlet air 330 and/or the downstream air 336, an amount of boost being generated by the turbocharger 124, and/or other performance parameters of the driveline 100.

Control System

Figure 9:
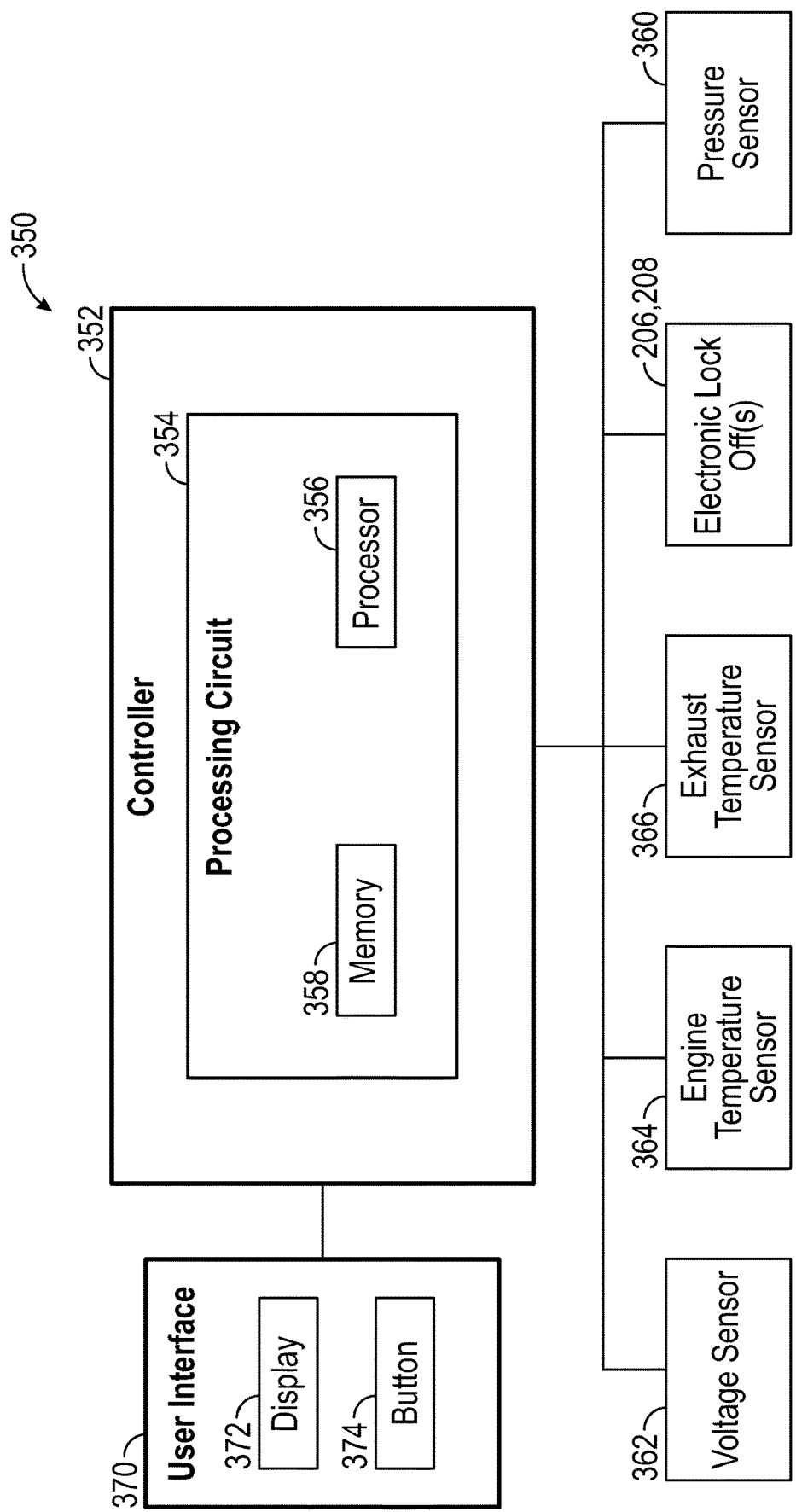
FIGS. 9 is a block diagram of a control system of the second fuel system of FIG. 1, according to an exemplary embodiment.

As shown in FIGS. 1 and 9, the supplemental fuel control system 350 includes (i) a system controller, shown as controller 352, (ii) a plurality of sensors, shown as pressure sensor 360, voltage sensor 362, engine temperature sensor 364, and exhaust temperature sensor 366, and (iii) a user input/output device, shown as user interface 370. In some embodiments, the supplemental fuel control system 350 does not include the user interface 370. In some embodiments, the supplemental fuel control system 350 does not include one or more of the pressure sensor 360, the voltage sensor 362, the engine temperature sensor 364, or the exhaust temperature sensor 366.

According to the exemplary embodiment shown in FIGS. 1 and 9, the controller 352 is configured to selectively engage, selectively disengage, control, or otherwise communicate with components of the supplemental fuel system 200 and the supplemental fuel control system 350. By way of example, the controller 352 may send and receive signals (e.g., control signals, data, etc.) with the first electronic lock off 206, the second electronic lock off 208, the pressure sensor 360, the voltage sensor 362, the engine temperature sensor 364, the exhaust temperature sensor 366, and/or the user interface 370.

The controller 352 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 9, the controller 352 includes a processing circuit 354 having a processor 356 and a memory 358. The processing circuit 354 may include an ASIC, one or more FPGAs, a DSP, circuits containing one or more processing components, circuitry for supporting a microprocessor, a group of processing components, or other suitable electronic processing components. In some embodiments, the processing circuit 354 is configured to execute computer code stored in the memory 358 to facilitate the activities described herein. The memory 358 may be any volatile or non-volatile computer-readable storage medium capable of storing data or computer code relating to the activities described herein. According to an exemplary embodiment, the memory 358 includes computer code modules (e.g., executable code, object code, source code, script code, machine code, etc.) configured for execution by the processing circuit 354. In some embodiments, the controller 352 may represent a collection of processing devices (e.g., servers, data centers, etc.). In such cases, the processing circuit 354 represents the collective processors of the devices, and the memory 358 represents the collective storage devices of the devices.

As shown in FIG. 1, the pressure sensor 360 is positioned to acquire pressure data from the pressurized fuel tank 202 regarding a pressure of the supplemental fuel within the pressurized fuel tank 202. In some embodiments, the pressure sensor 360 is additionally or alternatively configured to acquire pressure data regarding a pressure downstream of the pressurized fuel tank 202 (e.g., in a conduit). The pressure sensor 360 may be in wired or wireless communication with the controller 352. As shown in FIG. 1, the voltage sensor 362 is positioned to acquire voltage data from the power supply 112 regarding a voltage of the power supply 112. By way of example, the voltage sensor 362 may be positioned on a terminal of a battery of the power supply 112. The voltage sensor 362 may be in wired or wireless communication with the controller 352. As shown in FIG. 1, the engine temperature sensor 364 is positioned to acquire engine temperature data from the engine 104 regarding a temperature of the engine 104. By way of example, the engine temperature sensor 364 may be positioned to measure the temperature of the engine 104 through the water jacket of the engine 104. The engine temperature sensor 364 may be in wired or wireless communication with the controller 352. As shown in FIG. 1, the exhaust temperature sensor 366 is positioned to acquire exhaust temperature data from the exhaust manifold 144 of the engine 104 and/or from the exhaust system 108 regarding a temperature of the exhaust flowing out of the engine 104 and through the exhaust system 108. By way of example, the exhaust temperature sensor 366 may be positioned proximate the exhaust manifold 144. By way of another example, the exhaust temperature sensor 366 may be positioned upstream of the turbine 128 of the turbocharger 124. By way of still another example, the exhaust temperature sensor 366 may be positioned downstream of the turbine 128 of the turbocharger 124. By way of yet another example, the exhaust temperature sensor 366 may be positioned upstream of exhaust aftertreatment components of the exhaust 150. By way of yet still another example, the exhaust temperature sensor 366 may be positioned downstream of exhaust aftertreatment components of the exhaust 150. The exhaust temperature sensor 366 may be in wired or wireless communication with the controller 352. According to an exemplary embodiment, the controller 352 is configured to control one or more components of the supplemental fuel system 200 (e.g., the first electronic lock off 206, the second electronic lock off 208, to auto-engage the supplemental fuel system 200, the auto-disengage the supplemental fuel system, etc.) and/or the user interface 370 based on the pressure data, the voltage data, the engine temperature data, and/or the exhaust temperature data.

Figure 10:
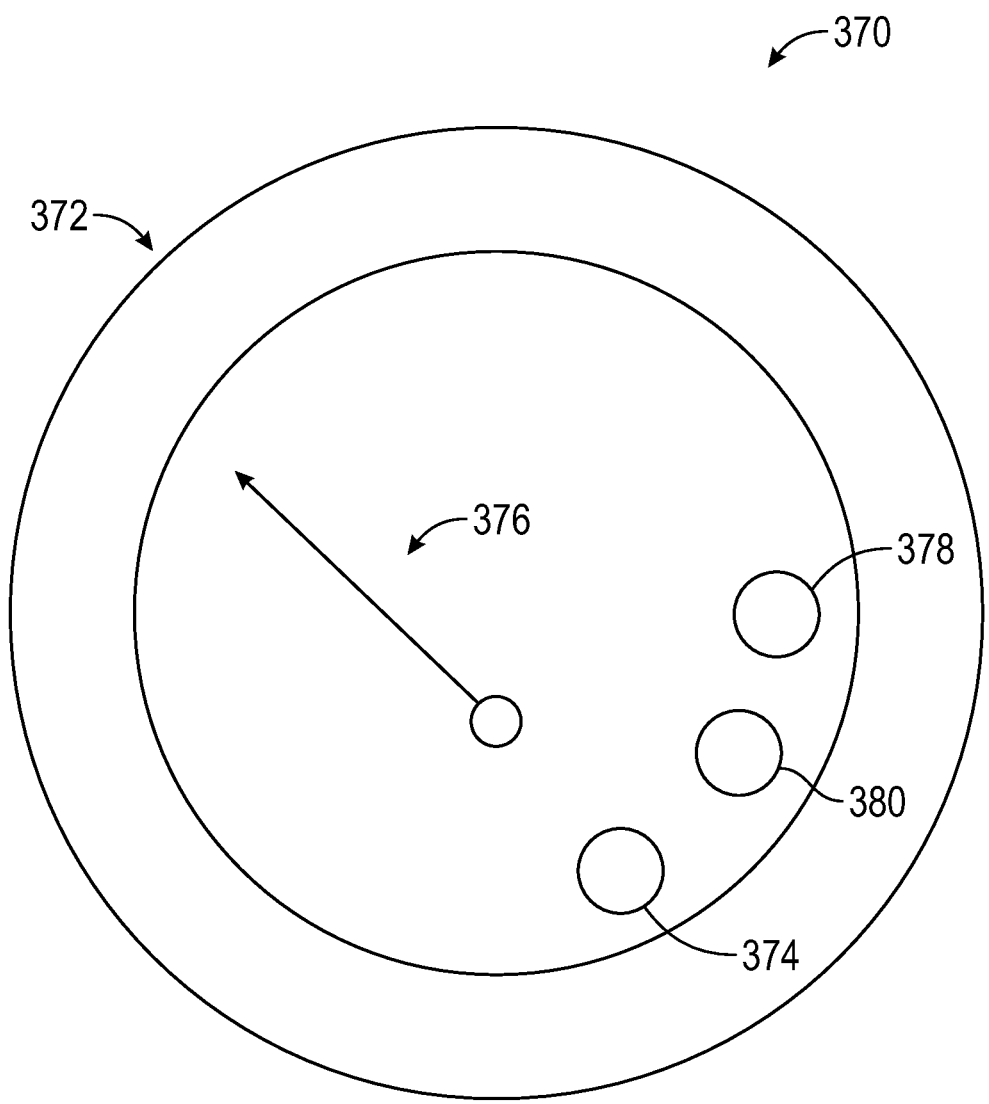
FIG. 10 shows a user interface of the control system of FIG. 9, according to an exemplary embodiment.

As shown in FIGS. 9 and 10, the user interface 370 includes an output device, shown as display 372, configured to output information and an input device, shown as button 374, configured to receive an input from a user. The button 374 may be a switch, knob, dial, a touch sensitive interface, etc. configured to facilitate turning the supplemental fuel system 200 on or off. By way of example, a user may selectively interact with the button 374 to send a signal to the controller 352 to open or close the first electronic lock off 206 and/or the second electronic lock off 208 (i.e., effectively turning the supplemental fuel system 200 on or off). In this way, a user may interact with the button 374 to selectively enable (e.g., unlock, open, etc.) or disable (e.g., close, lock, etc.) the supplemental fuel system 200 to start or stop providing a fuel flow of the supplement fuel to the engine 104. In other embodiments, the first electronic lock off 206 and/or the second electronic lock off 208 include manual actuators that facilitate manually opening and closing the first electronic lock off 206 and/or the second electronic lock off 208 in the absence of an electronic signal from the controller 352.

The display 372 may include one or more light emitting devices (e.g., screens, light emitting diodes, lights, LCD screens, OLED screens, etc.) for communicating the information to the user. As shown in FIG. 10, the display 372 of the user interface 370 includes a digital or analog output device, shown as pressure gauge 376, a first indicator (e.g., light emitting device or portion), shown as system power indicator 378, and a second indicator, shown as system status indicator 380. The pressure gauge 376 is configured to show a pressure based on the pressure data acquired by the pressure sensor 360. The system power indicator 378 is configured to display an indication that the supplemental fuel system 200 and the supplemental fuel control system 350 have power (e.g., properly connected to the power supply 112, based on the voltage data acquired by the voltage sensor 362, the ignition of the vehicle 10 is keyed on, etc.). The system status indicator 380 is configured to display an indication that the supplemental fuel system 200 is turned on (i.e., engaged) or turned off (i.e., disengaged) (e.g., based on an input provided to the button 374 by the user, based on auto-engagement/disengagement based on various sensor readings, etc.).

Pressure Based Control

According to an exemplary embodiment, the controller 352 is configured to control components of the supplemental fuel system 200 (e.g., the first electronic lock off 206, the second electronic lock off 208, etc.) and/or components of the supplemental fuel control system 350 (e.g., the user interface 370) based on the pressure data. Specifically, the controller 352 is configured to acquire the pressure data from the pressure sensor 360 to facilitate monitoring the pressure of the supplemental fuel within and/or exiting the pressurized fuel tank 202. In some embodiments, the controller 352 is configured to control the pressure gauge 376 based on the pressure data. In some embodiments, the controller 352 is configured to compare the pressure of the supplemental fuel within or exiting the pressurized fuel tank 202 to a pressure threshold (e.g., a low fuel pressure threshold). In response to the pressure being less than the pressure threshold (e.g., such that the supplemental fuel may no longer be usable), the controller 352 may be configured to control to the first electronic lock off 206 and/or the second electronic lock off 208 such that the first electronic lock off 206 and/or the second electronic lock off 208 close and prevent the supplemental fuel from flowing along the supplemental fuel system 200 and into the air supply system 106, thereby disengaging or "turning off" the supplemental fuel system 200.

Voltage Based Control

According to an exemplary embodiment, the controller 352 is configured to control components of the supplemental fuel system 200 (e.g., the first electronic lock off 206, the second electronic lock off 208, etc.) and/or components of the supplemental fuel control system 350 (e.g., the user interface 370) based on the voltage data. Specifically, the controller 352 is configured to acquire the voltage data from the voltage sensor 362 to facilitate monitoring the voltage of the power supply 112. Specifically, the voltage of the power supply 112 will vary based on whether the engine 104 is off or on. As an example, the power supply 112 may have a first or nominal voltage (e.g., about 12 volts) when the engine 104 is off. However, when the engine 104 is started and running, the alternator 110 is driven by the engine 104. The alternator 110, as a result, provides power to the power supply 112 and the voltage thereof increases to a second or elevated voltage (e.g., greater than 12 volts, between 12.8 and 14 volts, greater than 12.8 volts, about 14 volts, etc.).

In some embodiments, the controller 352 is configured to control the system power indicator 378, the first electronic lock off 206, and/or the second electronic lock off 208 based on the voltage data and/or a user input (e.g., provided via the button 374). In some embodiments, the controller 352 is configured to compare the voltage of the power supply 112 to a voltage threshold (e.g., greater than 12 volts, greater than 12.8 volts, etc.). In response to the voltage being less than the voltage threshold, the controller 352 may be configured to (i) control to the system power indicator 378 (i.e., turn it off) to indicate that the supplemental fuel system 200 is not powered on and/or (ii) control to the first electronic lock off 206 and/or the second electronic lock off 208 such that the first electronic lock off 206 and/or the second electronic lock off 208 close and prevent the supplemental fuel from flowing along the supplemental fuel system 200 and into the air supply system 106, thereby disengaging or "turning off" the supplemental fuel system 200. However, in response to the voltage being greater than the voltage threshold and/or in response to receiving a user input to turn on the supplemental fuel system 200 (e.g., via the user interface 370), the controller 352 may be configured to (i) control to the system power indicator 378 (i.e., turn it on) to indicate that the supplemental fuel system 200 is powered on and/or (ii) control to the first electronic lock off 206 and/or the second electronic lock off 208 such that the first electronic lock off 206 and/or the second electronic lock off 208 open and permit the supplemental fuel to flow along the supplemental fuel system 200 and into the air supply system 106, thereby engaging or "turning on" the supplemental fuel system 200.

Accordingly, the controller 352 may be configured to control engagement and disengagement of the supplemental fuel system 200 based on operation of the engine 104 by monitoring the voltage data and without directly having to determine whether the engine 104 has actually been turned on or is running. Therefore, the controller 352 may be configured to disengage the supplemental fuel system 200 anytime the engine 104 is not running (e.g., the vehicle 10 was involved in an accident and the engine 104 stops running, the ignition was keyed off, etc.) without actually directly determining if the engine 104 is running or monitoring the ignition position.

Figure 11:
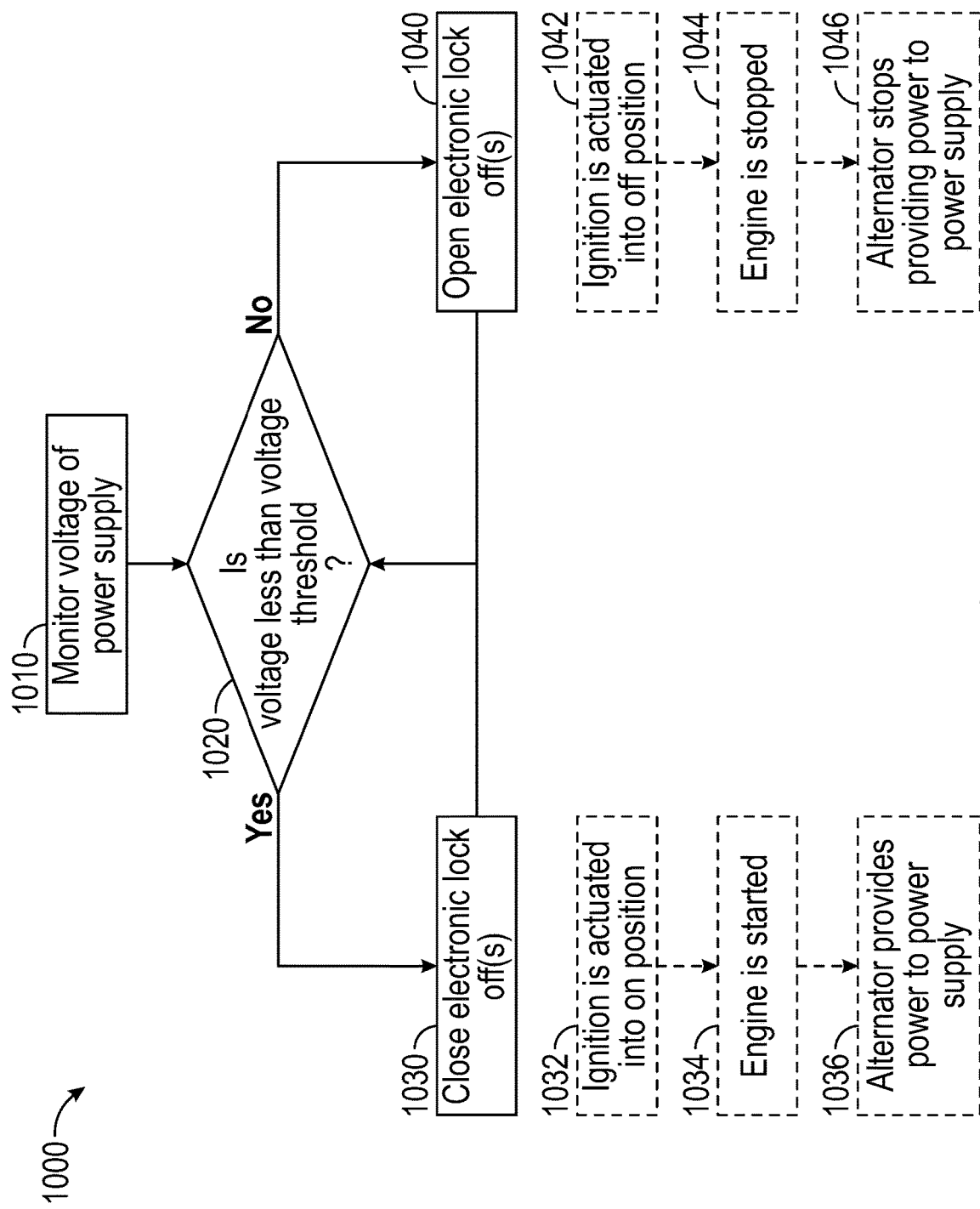
FIG. 11 is a flow diagram of a method for controlling the second fuel system of FIG. 1 based on voltage monitoring, according to an exemplary embodiment.

Referring now to FIG. 11, a method 1000 for controlling the supplemental fuel system 200 based on the voltage of the power supply 112 is shown, according to an exemplary embodiment. At step 1010, the controller 352 is configured to monitor the voltage of the power supply 112 (e.g., via the voltage data acquired from the voltage sensor 362). At step 1020, the controller 352 is configured to compare the voltage of the power supply 112 to a voltage threshold and determine whether the voltage is less than the voltage threshold (i.e., indicating that the engine 104 is off). If yes (i.e., the voltage is less than the voltage threshold), the controller 352 is configured to proceed to step 1030. If no (i.e., the voltage is greater than the voltage threshold), the controller 352 is configured to proceed to step 1040.

At step 1030, the controller 352 is configured to control the first electronic lock off 206 and/or the second electronic lock off 208 such that the first electronic lock off 206 and/or the second electronic lock off 208 close and, thereby, disengage or turn off the supplemental fuel system 200. The controller 352 is then configured to return to step 1020 and continue to monitor the voltage and compare the voltage to the voltage threshold. However, while the controller 352 continues to monitor the voltage and continues to determine that the voltage is less than the voltage threshold (i.e., the engine 104 is off), a user may key the ignition of the vehicle 10 to an on or start position (step 1032), which will cause the engine 104 to be started and run (step 1034), which will cause the alternator 110 to provide power to the power supply 112, increasing the voltage of the power supply 112 above the voltage threshold. In response, the controller 352 will determine no at Step 1020 and proceed to step 1040.

At step 1040, the controller 352 is configured to control the first electronic lock off 206 and/or the second electronic lock off 208 such that the first electronic lock off 206 and/or the second electronic lock off 208 open and, thereby, engage or turn on the supplemental fuel system 200. The controller 352 is then configured to return to step 1020 and continue to monitor the voltage and compare the voltage to the voltage threshold. However, while the controller 352 continues to monitor the voltage and continues to determine that the voltage is greater than the voltage threshold (i.e., the engine 104 is on), the user may key the ignition of the vehicle 10 to an off position (step 1042) such that the engine 104 turns off and stops or the vehicle 10 may encounter an event that causes the engine 104 to otherwise shut off (e.g., damage to the engine 104, damage to the primary fuel system 102, etc.) (step 1044), which will cause the alternator 110 to stop providing power to the power supply 112, decreasing the voltage of the power supply 112 below the voltage threshold. In response, the controller 352 will determine yes at Step 1020 and proceed to step 1030.

Exhaust Temperature Based Control

According to an exemplary embodiment, the controller 352 is configured to control components of the supplemental fuel system 200 (e.g., the first electronic lock off 206, the second electronic lock off 208, etc.) and/or components of the supplemental fuel control system 350 (e.g., the user interface 370) based on the exhaust temperature data. Specifically, the controller 352 is configured to acquire the exhaust temperature data from the exhaust temperature sensor 366 to facilitate monitoring the temperature of the exhaust gases exiting the engine 104 (e.g., out of the exhaust manifold 144) and/or flowing through the exhaust system 108. During operation of the vehicle 10, the temperature of the exhaust gases exiting the engine 104 and/or flowing though the exhaust system 108 may fluctuate. In some instances, the temperature of the exhaust gases may reach elevated levels (e.g., above 800° F., between 915° F. and 1000° F., etc.), which may indicate that the driveline 100 is about to perform a regeneration cycle. The controller 352 may be configured to disengage or turn off the supplemental fuel system 200 during events of high exhaust temperatures to reduce the risk of any interference with a factory/OEM designed regeneration process.

In some embodiments, the controller 352 is configured to compare the temperature of the exhaust gases to an exhaust temperature threshold (e.g., 800° F., 825° F., 850° F., 875° F., 900° F., 925° F., etc.). In response to the exhaust temperature being less than the exhaust temperature threshold (e.g., indicating that a regeneration process is not likely) and/or in response to receiving a user input to turn on the supplemental fuel system 200 (e.g., via the user interface 370), the controller 352 may be configured to control to the first electronic lock off 206 and/or the second electronic lock off 208 such that the first electronic lock off 206 and/or the second electronic lock off 208 open and permit the supplemental fuel to flow along the supplemental fuel system 200 and into the air supply system 106, thereby engaging or "turning on" the supplemental fuel system 200. However, in response to the exhaust temperature being greater than the exhaust temperature threshold (e.g., indicating that the regeneration process is likely), the controller 352 may be configured to control to the first electronic lock off 206 and/or the second electronic lock off 208 such that the first electronic lock off 206 and/or the second electronic lock off 208 close and prevent the supplemental fuel from flowing along the supplemental fuel system 200 and into the air supply system 106, thereby disengaging or "turning off" the supplemental fuel system 200.

Referring now to FIG. 12, a method 2000 for controlling the supplemental fuel system 200 based on the temperature of exhaust gases is shown, according to an exemplary embodiment. At step 2010, the engine 104 is running and outputting exhaust gases to the exhaust system 108. At step 2020, the exhaust temperature sensor 366 is configured to acquire exhaust temperature data by measuring the temperature of the exhaust gases. In some embodiments, the temperature of the exhaust gases is measured at a plurality of locations along the exhaust system 108 via a plurality of exhaust temperature sensors 366. At step 2030, the controller 532 is configured to acquire the exhaust temperature data and determine/monitor an exhaust temperature of the exhaust gases. At step 2040, the controller 352 is configured to compare the exhaust temperature to an exhaust temperature threshold. According to an exemplary embodiment, the exhaust temperature threshold may be a maximum temperature threshold of about 800° F. In some embodiments, the exhaust temperature threshold may be a maximum threshold below 800° F. In other embodiments, the exhaust temperature threshold may be a maximum threshold above 800° F. In still other embodiments, the exhaust temperature threshold may be a threshold range defining a minimum threshold and a maximum threshold.

At step 2050, the controller 532 is configured to determine whether the exhaust temperature is greater than the exhaust temperature threshold. If no (i.e., the exhaust temperature is less than the exhaust temperature threshold), the controller 532 is configured to proceed to step 2060. If yes (i.e., the exhaust temperature is greater than the exhaust temperature threshold), the controller 532 is configured to proceed to step 2070. At step 2060, in response to the exhaust temperature being greater than the exhaust temperature threshold, the controller 532 is configured to control the first electronic lock off 206 and/or the second electronic lock off 208 to stop the flow of the supplemental fuel. At step 2070, in response to the exhaust temperature being less than the exhaust temperature threshold, the controller 532 is configured to control the first electronic lock off 206 and/or the second electronic lock off 208 to permit the flow of the supplement fuel.

Engine Temperature Based Control

According to an exemplary embodiment, the controller 352 is configured to control components of the supplemental fuel system 200 (e.g., the first electronic lock off 206, the second electronic lock off 208, etc.) and/or components of the supplemental fuel control system 350 (e.g., the user interface 370) based on the engine temperature data. Specifically, the controller 352 is configured to acquire the engine temperature data from the engine temperature sensor 364 to facilitate monitoring the temperature (e.g., the water jacket temperature) of the engine 104. During operation of the vehicle 10, the temperature of the the engine 104 may fluctuate. By way of example, the engine 104 may be cold or not warmed up after sitting for a period of time. By way of another example, the engine 104 may run hot or be overheating (e.g., when a regeneration cycle is occurring or is about to occur, when a cooling system fails, etc.). In such instances, it may be beneficial to stop supplying the supplemental fuel to the engine 104 until the engine 104 returns to a desirable operating temperature range (e.g., between a minimum temperature threshold and a maximum temperature threshold).

In some embodiments, the controller 352 is configured to compare the temperature of the engine to an engine temperature threshold or a temperature range (e.g., between a minimum temperature threshold and a maximum temperature threshold). In response to the engine temperature being less than the engine temperature threshold or outside of the temperature range (e.g., indicating that the engine 104 is running hot or cold), the controller 352 may be configured to control to the first electronic lock off 206 and/or the second electronic lock off 208 such that the first electronic lock off 206 and/or the second electronic lock off 208 close and prevent the supplemental fuel from flowing along the supplemental fuel system 200 and into the air supply system 106, thereby disengaging or "turning off" the supplemental fuel system 200. However, in response to the engine temperature being greater than the engine temperature threshold or inside of the temperature range (e.g., indicating that the engine 104 is warmed up but not at an elevated temperature (a regeneration temperature) or overheating) and/or in response to receiving a user input to turn on the supplemental fuel system 200 (e.g., via the user interface 370), the controller 352 may be configured to control to the first electronic lock off 206 and/or the second electronic lock off 208 such that the first electronic lock off 206 and/or the second electronic lock off 208 open and permit the supplemental fuel to flow along the supplemental fuel system 200 and into the air supply system 106, thereby engaging or "turning on" the supplemental fuel system 200.

Referring now to FIG. 13, a method 3000 for controlling the supplemental fuel system 200 based on the temperature of the engine 104 is shown, according to an exemplary embodiment. At step 3010, the engine 104 is started. At step 3020, the engine temperature sensor 364 is configured to acquire engine temperature data by measuring the temperature of the engine 104. In some embodiments, the engine temperature is measured via a plurality of engine temperature sensors 364. In some embodiments, the engine temperature is measured via a water jacket temperature sensor for measuring a temperature of the water jacket of the engine 104. At step 3030, the controller 352 is configured to acquire the engine temperature data and determine/monitor the engine temperature of the engine 104. At step 3040, the controller 352 is configured to compare the engine temperature to an engine temperature threshold. The engine temperature threshold may be a minimum temperature threshold. In some embodiments, the controller 352 is configured to compare the engine temperature to an operating temperature range (e.g., a range between the minimum temperature threshold and a maximum temperature threshold). In such embodiments, a lower limit of the operating temperature range may be substantially similar to the engine temperature threshold.

At step 3050, the controller 532 is configured to determine whether the engine temperature is greater than the engine temperature threshold or within the operating temperature range. If yes (i.e., the engine temperature is greater than the engine temperature threshold or within the operating temperature range), the controller 532 is configured to proceed to step 3060. If no (i.e., the engine temperature is less than the engine temperature threshold or outside of the operating temperature range), the controller 532 is configured to proceed to step 3070. At step 3060, in response to the engine temperature being greater than the engine temperature threshold or within the operating temperature range, the controller 352 is configured to control the first electronic lock off 206 and/or the second electronic lock off 208 to permit the flow of the supplemental fuel. In step 3070, in response to the engine temperature being below the engine temperature threshold or outside of the operating temperature range, the controller 352 is configured to control the first electronic lock off 206 and/or the second electronic lock off 208 to prevent the flow of the supplement fuel.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle 10, the driveline 100, and the supplemental fuel system 200 and components thereof as shown in the various exemplary embodiments is illustrative only. Additionally, any element disclosed in one embodiment may be incorporated or utilized with any other embodiment disclosed herein.

The invention claimed is:

1. A supplemental fuel system for a machine having a compression-ignition engine, the supplemental fuel system comprising:
   an air intake tube having:
      a first end configured to interface with an air cleaner of an air supply system that provides air to the compression-ignition engine;
      a second end configured to interface with a compressor of a turbocharger of the air supply system; and
      a sidewall extending between the first end and the second end, the sidewall including a fuel interface configured to facilitate providing a supplemental fuel into the air intake tube to mix with the air upstream of the compressor of the turbocharger;
   a stem extending through the sidewall and defining the fuel interface, wherein the sidewall defines an aperture through which the stem extends;
   a pair of seals positioned at opposing sides of the aperture; and
   a pair of fasteners configured to compress the pair of seals against the aperture to provide an air-tight seal between the aperture and the stem.

2. The supplemental fuel system of claim 1, further comprising a nozzle positioned within the air intake tube, the nozzle defining a fuel inlet that interfaces with the stem.

3. The supplemental fuel system of claim 2, wherein the nozzle defines an air inlet, an outlet, a nozzle passage extending from the air inlet to the outlet, and the fuel inlet positioned between the air inlet and the outlet.

4. The supplemental fuel system of claim 3, wherein the nozzle has a first cross-sectional dimension that is less than a second cross-sectional dimension of the air intake tube such that (i) a first portion of the air flowing through the air intake tube flows through the nozzle passage and (ii) a second portion of the air flowing through the air intake tube flows around the nozzle.

5. The supplemental fuel system of claim 4, wherein the nozzle is configured to generate a vacuum signal at the fuel inlet as the first portion of the air flows through the nozzle passage, and wherein the stem and, thereby, the nozzle is configured to receive a flow of the supplemental fuel in response to and based on the vacuum signal.

6. The supplemental fuel system of claim 5, further comprising:
   a supplemental fuel tank configured to store the supplemental fuel; and
   a pressure regulator positioned downstream of the supplemental fuel tank and upstream of the stem, the pressure regulator configured to reduce a pressure of the supplemental fuel received from the supplemental fuel tank from a first pressure to a second pressure.

7. The supplemental fuel system of claim 6, wherein the supplemental fuel tank is configured to store the supplemental fuel as a compressed, gaseous fuel.

8. The supplemental fuel system of claim 6, wherein the pressure regulator is a first pressure regulator, further comprising a second pressure regulator positioned downstream of the first pressure regulator and upstream of the stem, and wherein the second pressure regulator is configured to reduce the pressure of the supplemental fuel received from the first pressure regulator from the second pressure to a third pressure.

9. The supplemental fuel system of claim 8, further comprising a valve assembly including (i) a valve body defining a valve body inlet and a valve body outlet and (ii) an adjuster, the valve body outlet interfacing with the stem, the adjuster positioned to facilitate selectively restricting an amount of the flow of the supplemental fuel through the valve body outlet and provided to the stem and the nozzle.

10. A supplemental fuel system for a machine having a compression-ignition engine, the supplemental fuel system comprising:
   an air intake tube having:
      a first end configured to interface with an air cleaner of an air supply system that provides air to the compression-ignition engine;
      a second end configured to interface with a compressor of a turbocharger of the air supply system; and
      a sidewall extending between the first end and the second end, the sidewall including a fuel interface configured to facilitate providing a supplemental fuel into the air intake tube to mix with the air upstream of the compressor of the turbocharger;
   a stem extending through the sidewall and defining the fuel interface;
   a nozzle positioned within the air intake tube, the nozzle defining a fuel inlet that interfaces with the stem, wherein the nozzle defines an air inlet, an outlet, a nozzle passage extending from the air inlet to the outlet, and the fuel inlet positioned between the air inlet and the outlet, wherein the nozzle has a first cross-sectional dimension that is less than a second cross-sectional dimension of the air intake tube such that (i) a first portion of the air flowing through the air intake tube flows through the nozzle passage and (ii) a second portion of the air flowing through the air intake tube flows around the nozzle, wherein the nozzle is configured to generate a vacuum signal at the fuel inlet as the first portion of the air flows through the nozzle passage, and wherein the stem and, thereby, the nozzle is configured to receive a flow of the supplemental fuel in response to and based on the vacuum signal;
   a supplemental fuel tank configured to store the supplemental fuel; and
   a first pressure regulator positioned downstream of the supplemental fuel tank and upstream of the stem, the first pressure regulator configured to reduce a pressure of the supplemental fuel received from the supplemental fuel tank from a first pressure to a second pressure;
   a second pressure regulator positioned downstream of the first pressure regulator and upstream of the stem, wherein the second pressure regulator is configured to reduce the pressure of the supplemental fuel received from the first pressure regulator from the second pressure to a third pressure;

a valve assembly including (i) a valve body defining a valve body inlet and a valve body outlet and (ii) an adjuster, the valve body outlet interfacing with the stem, the adjuster positioned to facilitate selectively restricting an amount of the flow of the supplemental fuel through the valve body outlet and provided to the stem and the nozzle;

an electronic lock off valve positioned between the supplemental fuel tank and the valve body; and a controller configured to control the electronic lock off valve to selectively prevent the supplemental fuel from being provided to the nozzle.

11. A supplemental fuel system for a machine having a compression-ignition engine, the supplemental fuel system comprising:

an air intake tube having:
    a first end configured to interface with an air cleaner of an air supply system that provides air to the compression-ignition engine;
    a second end configured to interface with a compressor of a turbocharger of the air supply system; and
    a sidewall extending between the first end and the second end, the sidewall including a fuel interface configured to facilitate providing a supplemental fuel into the air intake tube to mix with the air upstream of the compressor of the turbocharger;

a stem extending through the sidewall and defining the fuel interface; and a nozzle positioned within the air intake tube, the nozzle defining a fuel inlet that interfaces with the stem, wherein the nozzle defines an air inlet, an outlet, a nozzle passage extending from the air inlet to the outlet, and the fuel inlet positioned between the air inlet and the outlet, wherein the nozzle has a first cross-sectional dimension that is less than a second cross-sectional dimension of the air intake tube such that (i) a first portion of the air flowing through the air intake tube flows through the nozzle passage and (ii) a second portion of the air flowing through the air intake tube flows around the nozzle, wherein the nozzle is configured to generate a vacuum signal at the fuel inlet as the first portion of the air flows through the nozzle passage, wherein the stem and, thereby, the nozzle is configured to receive a flow of the supplemental fuel in response to and based on the vacuum signal, wherein the nozzle passage has a non-uniform profile that includes a first transition point, a second transition point, an inlet taper extending from the air inlet to the first transition point, a mixing chamber positioned between the first transition point and the second transition point, and an outlet taper extending from the second transition point to the outlet, and wherein the inlet taper is different than the outlet taper.

12. The supplemental fuel system of claim 11, wherein the inlet taper has a first longitudinal length and the outlet taper has a second longitudinal length, and wherein a ratio of second longitudinal length to the first longitudinal length is greater than 1:1.

13. The supplemental fuel system of claim 12, wherein the ratio is about 3:1.

14. The supplemental fuel system of claim 11, wherein the fuel inlet is positioned along the mixing chamber closer to the second transition point than the first transition point.

15. A supplemental fuel system for a machine having a compression- ignition engine, the supplemental fuel system comprising:

an air intake tube having:
    a first end configured to interface with an air cleaner of an air supply system that provides air to the compression-ignition engine;
    a second end configured to interface with a compressor of a turbocharger of the air supply system; and
    a sidewall extending between the first end and the second end;

a stem extending through the sidewall between the first end and the second end, the stem configured to couple to a supplemental fuel source; and a nozzle positioned within the air intake tube;

wherein the nozzle defines a nozzle passage that has an air inlet, an outlet, a first transition point, a second transition point, an inlet taper extending from the air inlet to the first transition point, a mixing chamber positioned between the first transition point and the second transition point, an outlet taper extending from the second transition point to the outlet, and a fuel inlet positioned along the mixing chamber and that interfaces with the stem;

wherein the nozzle has an outer diameter of about 3 inches, the mixing chamber has a chamber diameter of about 2 inches, the nozzle has a nozzle length of about 4 inches, the inlet taper has an inlet length of about 0.5 inches, the mixing chamber has a chamber length of about 2 inches, and the outlet taper has an outlet length of about 1.5 inches;

wherein the outer diameter is less than a cross-sectional dimension of the air intake tube such that (i) a first portion of the air flowing through the air intake tube flows through the nozzle passage and (ii) a second portion of the air flowing through the air intake tube flows around the nozzle; and wherein the nozzle configured to generate a vacuum signal at the fuel inlet as the first portion of the air flows through the nozzle passage to facilitate drawing a supplemental fuel from the supplemental fuel source into the air intake tube to mix with the air upstream of the compressor of the turbocharger.

\* \* \* \* \*